(12) United States Patent
Liang et al.

(10) Patent No.: US 9,143,297 B2
(45) Date of Patent: Sep. 22, 2015

(54) METHOD AND DEVICE FOR DATA TRANSMISSION

(75) Inventors: Chunli Liang, Shenzhen (CN); Bo Dai, Shenzhen (CN); Bin Yu, Shenzhen (CN); Weiwei Yang, Shenzhen (CN); Yuqiang Zhang, Shenzhen (CN)

(73) Assignee: ZTE Corporation, Shenzhen (CN)

( * ) Notice: Subject to any disclaimer, the term of this patent is extended or adjusted under 35 U.S.C. 154(b) by 176 days.

(21) Appl. No.: 13/977,907

(22) PCT Filed: Jul. 21, 2011

(86) PCT No.: PCT/CN2011/077460
§ 371 (c)(1),
(2), (4) Date: Aug. 26, 2013

(87) PCT Pub. No.: WO2012/088876
PCT Pub. Date: Jul. 5, 2012

(65) Prior Publication Data
US 2014/0010182 A1     Jan. 9, 2014

(30) Foreign Application Priority Data
Dec. 30, 2010  (CN) .......................... 2010 1 0616294

(51) Int. Cl.
*H04W 4/00*   (2009.01)
*H04L 5/00*   (2006.01)

(52) U.S. Cl.
CPC ............ *H04L 5/0048* (2013.01); *H04L 5/0053* (2013.01)

(58) Field of Classification Search
None
See application file for complete search history.

(56) References Cited

U.S. PATENT DOCUMENTS

| 2010/0165931 | A1  | 7/2010  | Nimbalker et al. |
| 2012/0046032 | A1* | 2/2012  | Baldemair et al. ............ 455/434 |
| 2012/0307779 | A1* | 12/2012 | Noh et al. ..................... 370/329 |

FOREIGN PATENT DOCUMENTS

| CN | 101286970 A | 10/2008 |
| CN | 101594683 A | 12/2009 |
| CN | 102098086 A | 6/2011 |

OTHER PUBLICATIONS

English abstract of CN102098086A, Jun. 15, 2011
English abstract of CN101286970A, Oct. 15, 2008.
English abstract of CN101594683A, Dec. 2, 2009.

* cited by examiner

*Primary Examiner* — Frank Duong
(74) *Attorney, Agent, or Firm* — Porter Wright Morris & Arthur LLP

(57) ABSTRACT

The present disclosure discloses a method and a device for transmitting data. The method includes: a UE determining, according to a preset rule, whether to transmit PUCCH and/or PUSCH and/or an SRS or not on a last symbol of a current subframe; the UE determining the PUCCH and/or the PUSCH to be transmitted on the current subframe according to availability of the last symbol of the current subframe for transmitting the PUCCH and/or the PUSCH; and the UE transmitting the PUCCH and/or the PUSCH on the current subframe and/or transmitting the SRS on the last symbol of the current subframe. In virtue of the present disclosure, it can be realized that a plurality of types of physical uplink signals/channels are simultaneously transmitted.

28 Claims, 9 Drawing Sheets

METHOD AND DEVICE FOR DATA TRANSMISSION

FIELD OF THE INVENTION

The present disclosure relates to the communication field, and in particular to a method and a device for data transmission.

BACKGROUND OF THE INVENTION

The physical uplink channels of the Long Term Evolution (LTE for short) system comprise a physical random access channel (PRACH for short), a physical uplink shared channel (PUSCH for short), and a physical uplink control channel (PUCCH for short). In addition, there are two types of physical uplink signals, one type is demodulation reference signal (DMRS for short) for demodulating a data/control signaling, and the other type is sounding reference signal (SRS for short) for measuring an uplink channel. The PUSCH/PUCCH has two different types of cyclic prefix (CP for short) lengths, i.e. normal cyclic prefix (Normal CP for short) and extended cyclic prefix (Extended CP for short).

In the current LTE system, a physical uplink control information (Uplink Control Information, UCI for short) comprises an ACK/NACK, a channel state information (CSI, wherein the CSI includes: a Channel Quality Indicator (CQI), a Precoding Matrix Indicator (PMI) and Rank Indicator (RI)), and a scheduling request (SR) and a combination when they are simultaneously transmitted. It is also prescribed by the LTE that if there is no PUSCH transmission in the current subframe, one or more types of the UCIs above (only limited to combinations of two types of the UCIs) are transmitted on the PUCCH, and if there is PUSCH transmission in the current subframe, one or more types of the UCIs above are transmitted on the PUSCH together with the data.

The LTE defines multiple types of PUCCH format, including PUCCH format 1/1a/1b (a schematic diagram of channel structure thereof is as shown in FIG. 1) and format 2/2a/2b (a schematic diagram channel structure thereof is as shown in FIG. 2), wherein the format 1 is configured to transmit a scheduling request from a UE, the format 1a and format 1b are configured to feed back an 1-bit ACK/NACK and 2-bit ACK/NACK respectively, the format 2 is configured to transmit downlink channel state information, the format 2a is configured to transmit CSI information multiplexed with 1-bit ACK/NACK and the format 2b is configured to transmit CSI information multiplexed with 2-bit ACK/NACK.

In addition, in order to support the simultaneous transmission of the PUCCH format 1/1a/1b and an SRS, LTE also defines the shortened format of the PUCCH format 1/1a/1b, that is, the PUCCH is not configured to transmit the PUCCH on the last symbol of a subframe, and the last symbol of the subframe is configured to transmit the SRS. With respect to the shortened format, a format in which a last symbol of a subframe is configured to transmit the PUCCH is called a normal PUCCH format.

The SRS is a signal transmitted from the UE for the eNB to measure wireless the channel information (channel state information, CSI for short) by an eNB. In the LTE system, the UE transmits an uplink SRS periodically on the last symbol of a subframe according to parameters such as bandwidth, frequency domain location, sequence cyclic shift, period and subframe offset configured by an eNB. The eNB determines an uplink CSI of the UE according to a received SRS and performs operations such as frequency domain selection scheduling and closed-loop power control according to the obtained CSI. The LTE only supports periodic SRS. Therefore, in the following descriptions, the SRS always refers to periodic SRS if there is no specific instruction.

It is prescribed by the LTE that the SRS is transmitted on the last symbol of a subframe, and meanwhile, in order to maintain single-carrier properties of an uplink signal and avoid mutual interference between an SRS and a PUSCH/PUCCH of different UEs, the LTE makes the following regulations.

(1) When the UE needs to simultaneously transmit the PUSCH and the SRS on a certain subframe, the last symbol of the corresponding subframe does not transmit PUSCH, and the SRS is transmitted on the last symbol of the subframe.

(2) When the UE only needs to transmit the PUSCH on a certain subframe, if the subframe is higher layer configured as a cell-specific SRS subframe, then, when a resource allocation of the PUSCH partially overlaps with the higher layer configured cell-specific SRS bandwidth configuration, the last symbol of the subframe does not transmit the PUSCH; otherwise, the last symbol of the subframe transmits the PUSCH.

(3) When the UE needs to simultaneously transmit the PUCCH and the SRS on a certain subframe, if the PUCCH is of the PUCCH format 1/1a/1b, then, when a higher-layer configured parameter Simultaneous-AN-and-SRS is TRUE, the PUCCH is transmitted using a shortened format, and the SRS is transmitted on the last symbol of the subframe; otherwise, the PUCCH is transmitted using a normal format, and meanwhile, the SRS is skipped (that is to say, no SRS is transmitted on the current subframe).

(4) When the UE needs to simultaneously transmit the PUCCH and the SRS on a certain subframe, if the PUCCH is of the PUCCH format 2/2a/2b, then, the UE only transmits the PUCCH, and meanwhile, the SRS is skipped.

In an International Mobile Telecommunications-Advanced (IMT-Advanced for short) system, a high-speed transmission of data can be realized, and there is a quite large system capacity. A peak rate of the IMT-Advanced system can reach 1 Gbit/s in a situation of low-speed movement and hot-spot coverage, and 100 Mbit/s in a situation of high-speed movement and wide Area coverage.

In order to satisfy requirements of the International Telecommunication Union-Advanced (ITU-Advanced for short), the Long Term Evolution Advanced (LTE-A for short) system, as the evolution standard of the LTE, should support wider system bandwidths (up to 100 MHz), and also needs to be backward compatible with the existing standards of the LTE. On the basis of the existing LTE system, the bandwidths of the LTE system can be combined to obtain a wider bandwidth, which technology is called carrier aggregation (CA for short) technology. This technology is capable of enhancing the frequency spectrum utilization of the IMT-Advance system, relieving the shortage of the frequency spectrum resources and further optimizing the utilization of the frequency spectrum resources.

In a system to which the CA is introduced, a carrier performing aggregation is called a Component Carrier (CC for short), and is also called a cell. Moreover, concepts of primary component carrier/cell (PCC/PCell for short) and secondary component carrier/cell (SCC/SCell for short) are also put forward. A system having performed the CA at least comprises one primary component carrier and one secondary component carrier, wherein the primary component carrier is always in an activation state. In the following descriptions, the component carrier and the cell are equivalent.

After the introduction of the CA, in the current discussion about relationships among a downlink component carrier, a PDSCH transmission block and a HARQ process, one basic working assumption is that when no space division multiplexing is used, one downlink component carrier is corresponding to one PDSCH transmission block and one HARQ process, that is to say, the UE needs to feed back a 1-bit ACK/NACK for one PDSCH transmission block of each component carrier. When the space division multiplexing is used, it is currently prescribed by the LTE-A that at most two transmission blocks are supported. As a result, when the space division multiplexing is used, the UE needs to feed back a 2-bit ACK/NACK for two PDSCH transmission blocks of each downlink component carrier.

In an LTE-A system in which the frequency spectrum aggregation technology is used, the uplink bandwidth and the downlink bandwidth can comprise a plurality of component carriers. When an eNB has PDSCHs on a plurality of downlink component carriers to be scheduled to a certain UE, and when the UE has no PUSCH to be transmitted in a current subframe, a terminal should feedback the ACK/NACK for the PDSCHs of the plurality of downlink component carriers on the PUCCH. A current working assumption is that these ACK/NACK are transmitted on one UE-specific uplink component carrier; as for SR information, a current working assumption is that the UE only transmits one SR, and the SR information is transmitted on one UE-specific uplink component carrier; and as for CSI information, a current working assumption is that the CSI information is transmitted on one UE-specific uplink component carrier.

In the LTE-A system, a current working assumption is that the UE transmits the SR information by using the PUCCH format 1, and the UE transmits the CSI by using the PUCCH format 2. As for the ACK/NACK, it can be transmitted not only by the PUCCH format 1a, 1b and multiplexing with channel selection, which have been already defined in LTE, but also by a new DFT-s-OFDM-based format, which is added to the LTE-A for transmitting ACK/NACK with a larger payload, and the channel structure schematic diagram of the DFT-s-OFDM-based format is as shown in FIG. 3. For the sake of convenient description, this format is called PUCCH Format 3. For a UE that at most can support a 4-bit ACK/NACK feedback, the ACK/NACK thereof will be fed back in a manner of the PUCCH format 1b with channel selection, and for a high-end UE that can support more than 4 bits ACK/NACK feedback, the mode in which the UE feeds back the ACK/NACK is configured by higher-layer signaling.

Apart from the CA technology, an uplink multi-antenna is also introduced into the LTE-A, and at most four antennas can be configured as uplink transmitting antennas. Therefore, in order to obtain the channel state information of each uplink transmitting antenna, the UE needs to simultaneously transmit the SRS on multiple antennas.

It is put forward in the existing LTE-A research that in the uplink communication, non-precoded (i.e. antenna-specific) SRS should be used, and the DMRS of the PUSCH should be precoded. The eNB can get an estimate of an original CSI of the uplink by receiving the non-precoded SRS, and the DMRS that has been precoded cannot enable the eNB to get an estimate of the original CSI of the uplink. At this time, when the UE transmits the non-precoded SRS by using multiple antennas, SRS resources needed by each UE are increased, which also results in decrease of the number of UEs that can be simultaneously multiplexed in the system. Besides, apart from retaining the original periodic transmission of the SRS of the LTE, in order to improve the utilization ratio of the SRS resources and enhance the flexibility of the resource scheduling, the SRS also can be transmitted aperiodically via downlink control information or higher-layer signaling for a UE.

In the LTE-A, in order to make full use of the uplink resources and consider the generally good channel quality in an application scenario of the carrier aggregation, requirements to the single carrier properties of the uplink signal are relaxed, and the PUCCH and the PUSCH are allowed to be simultaneously transmitted. Whether to allow the UE to simultaneously transmit the PUCCH and the PUSCH or not can be configured with higher-layer parameters.

Therefore, in the LTE-A system, when confronted with introduction of various novel technologies, such as CA, uplink multi-antenna, PUCCH format 3, aperiodic SRS and simultaneous transmission of the PUCCH and the PUSCH, the existing UE cannot realize simultaneous transmission of a plurality of types of physical uplink signals/channels.

SUMMARY OF THE INVENTION

The present disclosure is proposed upon considering the problem that the existing UE cannot realize simultaneous transmission of a plurality of types of physical uplink signals/channels when confronted with the introduction of various novel technologies. Therefore, the object of the present disclosure is to provide a method and a device for data transmission to solve the above problem.

In order to achieve the above object, a method for transmitting data is provided according to one aspect of the present disclosure.

The method for transmitting data according to the present disclosure comprises: a UE determining, according to a preset rule, whether to transmit PUCCH and/or PUSCH or a SRS or not on a last symbol of a current subframe; the UE determining the PUCCH and/or the PUSCH data to be transmitted on the current subframe according to availability of the last symbol of the current subframe for transmitting the PUCCH and/or the PUSCH; and the UE transmitting the PUCCH and/or the PUSCH on the current subframe and/or transmitting the SRS on the last symbol of the current subframe.

The UE determining, according to the preset rule, whether to transmit the PUCCH or the PUSCH or the SRS or not on the last symbol of the current subframe (rule 1) comprises: the UE determining not to transmit the PUSCH on the last symbol of the current subframe when the current subframe is higher-layer configured as a cell-specific SRS subframe for the component carrier on which the PUSCH is transmitted.

The UE determining, according to the preset rule, whether to transmit the PUCCH and/or the PUSCH or the SRS or not on the last symbol of the current subframe (rule 2) comprises: the UE determining not to transmit the PUSCH on the last symbol of the current subframe when the current subframe is higher-layer configured as a cell-specific SRS subframe for the component carrier on which the PUSCH is transmitted and the allocation of the PUSCH partially overlaps with the higher-layer configured cell-specific SRS bandwidth configuration.

The UE determining, according to the preset rule, whether to transmit the PUCCH and/or the PUSCH or the SRS or not on the last symbol of the current subframe (rule 3) comprises: the UE determining not to transmit the PUSCH on the last symbol of the current subframe when the current subframe is higher-layer configured as a cell-specific SRS subframe for the component carrier on which the PUSCH is transmitted or the component carrier other than the PUSCH is transmitted.

The UE determining, according to the preset rule, whether to transmit the PUCCH data and/or the PUSCH or the SRS or not on the last symbol of the current subframe (rule 4) comprises: when the PUCCH format is format 1/1a/1b/3, the UE determining not to transmit the PUCCH on the last symbol of the current subframe when the higher-layer configured parameter for simultaneous transmission of ACK/NACK and SRS is TRUE for the UE and when the current subframe is higher-layer configured as a cell-specific SRS subframe for the primary component carrier.

The UE determining the PUCCH and/or the PUSCH to be transmitted on the current subframe according to availability of the last symbol of the current subframe for transmitting the PUCCH data and/or the PUSCH comprises: when the last symbol of the current subframe is unable to transmit the PUSCH, the UE setting $N_{SRS}$ to be 1 when determining the number of time domain symbols occupied by the PUSCH; otherwise, the UE setting the $N_{SRS}$ to be 0, wherein the $N_{SRS}$ is a variable representing whether the current subframe needs to transmit the SRS; and when the last symbol of the current subframe is unable to transmit the PUCCH format 1/1a/1b/3, the UE transmitting the PUCCH on the current subframe with a shortened format, otherwise, transmitting the PUCCH with a normal format.

The UE determining the number of the time domain symbols occupied by the PUSCH by a formula as following: $N_{symb}^{PUSCH\text{-}initial}=(2\cdot(N_{symb}^{UL}-1)-N_{SRS})$, where $N_{symb}^{PUSCH\text{-}initial}$ is the number of the time domain symbols occupied by the PUSCH, and $N_{symb}^{UL}$ is the number of symbols in one time slot.

The UE determining, according to the preset rule, whether to transmit the PUCCH and/or the PUSCH or the SRS or not on the last symbol of the current subframe (rule 5) comprises: the UE transmitting the SRS with a higher priority on the last symbol of the current subframe according to a preset priority rule when the UE simultaneously transmits SRSs on a plurality of uplink component carriers on the current subframe, and no PUSCH and/or PUCCH of the UE is transmitted on the last symbol of the current subframe.

The UE determining, according to the preset rule, whether to transmit the PUCCH and/or the PUSCH or the SRS or not on the last symbol of the current subframe (rule 6) comprises: the UE transmitting one SRS with a highest priority on the last symbol of the current subframe according to a preset priority rule when the UE simultaneously transmits SRSs on a plurality of uplink component carriers on the current subframe, and no PUSCH and/or PUCCH of the UE is transmitted on the last symbol of the current subframe in a Long Term Evolution Advanced (LTE-A) system.

The UE determining, according to the preset rule, whether to transmit the PUCCH data and/or the PUSCH data or the SRS or not on the last symbol of the current subframe (rule 7) comprises: when the UE simultaneously transmits SRSs on a plurality of uplink component carriers on the current subframe, and no PUSCH and/or PUCCH of the UE is transmitted on the last symbol of the current subframe, when the UE is configured by a higher-layer signaling to allow simultaneously transmitting n SRSs on the last symbol of the subframe, the UE transmitting the n SRSs with a high priority on the last symbol of the current subframe according to a preset priority rule, wherein n is an integer greater than 1; and alternatively, when the UE is configured by the higher-layer signaling to not allow simultaneously transmitting the n SRSs on the last symbol of the subframe, the UE transmitting one SRS having a highest priority on the last symbol of the current subframe according to a preset priority rule.

The UE is configured by the higher-layer signaling to allow simultaneously transmitting the n SRSs on the last symbol of the subframe comprises one of the following: the higher-layer signaling being a higher-layer signaling newly added to a Long Term Evolution Advanced (LTE-A) system, or the higher-layer signaling being a higher-layer signaling that has been defined by the LTE-A system and is configured to instruct to allow simultaneously transmitting a PUSCH and a PUCCH; instructing to allow the UE to simultaneously transmit n SRSs by setting a higher-layer signaling, which is configured to instruct to allow simultaneously transmitting the PUSCH and the PUCCH, to be TRUE or ON; and instructing that the UE can only transmit one SRS by setting a higher-layer signaling, which is configured to instruct to allow simultaneously transmitting the PUSCH and the PUCCH, to be FALSE or OFF.

The preset priority rule (priority rule 1) comprises: setting a priority of an uplink component carrier to be a priority of transmitting an SRS on a corresponding component carrier.

The preset priority rule (priority rule 2) comprises at least one of the following: preferentially setting a priority of an aperiodic SRS to be higher than a priority of a periodic SRS; secondly, setting a priority of an SRS on a primary uplink component carrier to be higher than a priority of other component carriers; thirdly, setting a priority of an SRS on a component carrier, on which a PUSCH with UCI is simultaneously transmitted, to be higher than a priority of an SRS on a component carrier on which a PUSCH without UCI is simultaneously transmitted; and fourthly, setting a priority of an SRS on a component carrier, on which a PUSCH is simultaneously transmitted, to be higher than a priority of an SRS on a component carrier on which no PUSCH is simultaneously transmitted; if priorities of SRSs on a plurality of component carriers are still the same after the above priority rules are applied, priorities of the uplink component carriers are set to be priorities of SRSs on a plurality of corresponding component carriers.

The UE determining, according to the preset rule, whether to transmit the PUCCH and/or the PUSCH or the SRS or not on the last symbol of the current subframe comprises: the UE determining to transmit the PUCCH and not to transmit a periodic SRS on the current subframe when the UE simultaneously transmits PUCCH format 2/2a/2b and the periodic SRS on the current subframe.

The UE determining, according to the preset rule, whether to transmit the PUCCH and/or the PUSCH or the SRS or not on the last symbol of the current subframe comprises: the UE determining to transmit the PUCCH and not to transmit an aperiodic SRS on the current subframe when the UE simultaneously transmits PUCCH format 2/2a/2b multiplexed with an ACK/NACK and the aperiodic SRS on the current subframe.

The UE determining, according to the preset rule, whether to transmit the PUCCH and/or the PUSCH or the SRS or not on the last symbol of the current subframe comprises: the UE determining not to transmit the PUCCH and to transmit an aperiodic SRS on the current subframe when the UE simultaneously transmits a PUCCH format 2 without ACK/NACK and the aperiodic SRS on the current subframe.

The UE determining, according to the preset rule, whether to transmit the PUCCH and/or the PUSCH or the SRS or not on the last symbol of the current subframe comprises: the UE determining to transmit the PUSCH or the PUCCH on the current subframe and not to transmit the SRS on the last symbol of the current subframe when the UE simultaneously transmits PUSCH or PUCCH format 1/1a/1b/3 and the SRS on the current subframe and the last symbol of the current subframe is configured to transmit the PUSCH or the PUCCH format 1/1a/1b/3 of the UE.

The UE determining, according to the preset rule, whether to transmit the PUCCH and/or the PUSCH or the SRS or not on the last symbol of the current subframe comprises: the UE determining to transmit the PUSCH or the PUCCH on the symbols other than the last symbol of the current subframe, and to transmit the SRS on the last symbol of the current subframe, when the UE simultaneously transmits PUSCH or PUCCH format 1/1a/1b/3 and the SRS on the current subframe and the last symbol of the current subframe is not configured to transmit the PUSCH or the format 1/1a/1b/3 of the PUCCH of the UE.

The UE determining, according to the preset rule, whether to transmit the PUCCH data and/or the PUSCH data or the SRS or not on the last symbol of the current subframe comprises: when the UE simultaneously transmits a PUCCH, a PUSCH and the SRS on the current subframe, and a higher-layer signaling configured to instruct to allow simultaneously transmitting the PUSCH and the PUCCH is TRUE or ON, the UE firstly determining transmission of the PUCCH and the SRS in accordance with a processing method of transmitting the PUCCH and the SRS on the same subframe; if the last symbol of the subframe still needs to transmit the SRS after the above processing, further determining transmission of the PUSCH and the SRS in accordance with a processing method of transmitting the PUSCH and the SRS on the same subframe.

Determining transmission of the PUCCH and the SRS in accordance with the processing method of transmitting the PUCCH and the SRS on the same subframe comprises: the UE determining to transmit the PUCCH and not to transmit a periodic SRS on the current subframe when the UE simultaneously transmits PUCCH format 2/2a/2b and the periodic SRS on the current subframe; the UE determining to transmit the PUCCH and not to transmit an aperiodic SRS on the current subframe when the UE simultaneously transmits the PUCCH format 2/2a/2b multiplexed with ACK/NACK and the aperiodic SRS on the current subframe; the UE determining not to transmit the PUCCH, and to transmit the aperiodic SRS on the current subframe when the UE simultaneously transmits a PUCCH format 2 without ACK/NACK and the aperiodic SRS on the current subframe; the UE determining to transmit the PUCCH on the current subframe, and not to transmit the SRS on the last symbol of the current subframe when the UE simultaneously transmits the PUCCH format 1/1a/1b/3 and the SRS on the current subframe and the last symbol of the current subframe is configured to transmit PUCCH format 1/1a/1b/3 of the UE; and the UE determining to transmit the PUCCH on a symbol other than the last symbol of the current subframe, and to transmit the SRS on the last symbol of the current subframe when the UE simultaneously transmits the PUCCH format 1/1a/1b/3 and the SRS on the current subframe and the last symbol of the current subframe is not configured to transmit the PUCCH format 1/1a/1b/3 of the UE.

The UE determining, according to the preset rule, whether to transmit the PUCCH and/or the PUSCH or the SRS or not on the last symbol of the current subframe comprises: when the UE simultaneously transmits the PUCCH, the PUSCH and the SRS on the current subframe and the higher-layer signaling that is configured to instruct to allow simultaneously transmitting the PUSCH and the PUCCH is FALSE or OFF, the UE firstly transmitting UCI information carried by the PUCCH on the PUSCH; and the UE determining transmission of the PUSCH and the SRS in accordance with a processing method of transmitting the PUSCH and the SRS on the same subframe.

The determining transmission of the PUSCH and the SRS in accordance with the processing method of transmitting the PUSCH and the SRS on the same subframe comprises: the UE determining to transmit the PUSCH data on the current subframe and not to transmit the SRS on the last symbol of the current subframe, when the UE simultaneously transmits the PUSCH data and the SRS on the current subframe and when the last symbol of the current subframe is configured to transmit the PUSCH data of the UE; and the UE determining to transmit the PUSCH data on a symbol other than the last symbol of the current subframe and to transmit the SRS on the last symbol of the current subframe, when the UE simultaneously transmits the PUSCH data and the SRS on the current subframe and when the last symbol of the current subframe is not configured to transmit the PUSCH of the UE.

In order to achieve the above object, a device for transmitting data is provided according to another aspect of the present disclosure.

The device for transmitting data according to the present disclosure comprises: a first determining module, configured to determine, according to a preset rule, whether to transmit physical uplink control channel (PUCCH) data and/or physical uplink shared channel (PUSCH) data or a sounding reference signal (SRS) or not on a last symbol of a current subframe; a second determining module, configured to determine the PUCCH data and/or the PUSCH data to be transmitted on the current subframe according to availability of the last symbol of the current subframe for transmitting the PUCCH data and/or the PUSCH data; and a transmitting module, configured to transmit the PUCCH data and/or the PUSCH data on the current subframe and/or to transmit the SRS on the last symbol of the current subframe.

In the present disclosure, the PUCCH data and/or the PUSCH data and/or the SRS are transmitted according to different preset rules, and it can be realized that a plurality of types of physical uplink signals/channels are simultaneously transmitted.

BRIEF DESCRIPTION OF THE DRAWINGS

Drawings, provided for further understanding of the present disclosure and forming a part of the present application, are used to explain the present disclosure. The exemplary embodiments of the present disclosure and descriptions thereof are used to explain the present disclosure rather than to unduly limit the present disclosure, wherein.

DETAILED DESCRIPTION OF EMBODIMENTS

It should be indicated that the embodiments and features therein of the present application can be combined with each other if no conflict is caused. The present disclosure will be described hereinafter in detail with reference to the figures in conjunction with the embodiments.

Figure 1:
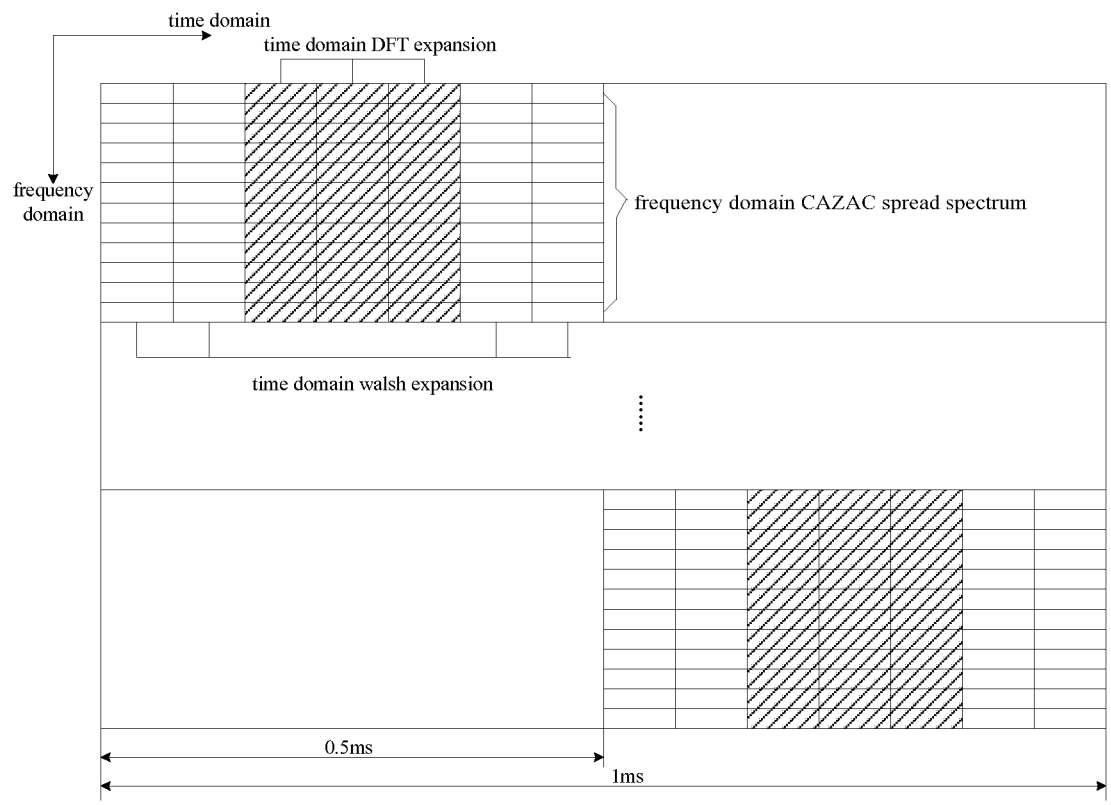
FIG. 1 is a structural schematic diagram of PUCCH format 1/1a/1b according to related art.
Figure 2:
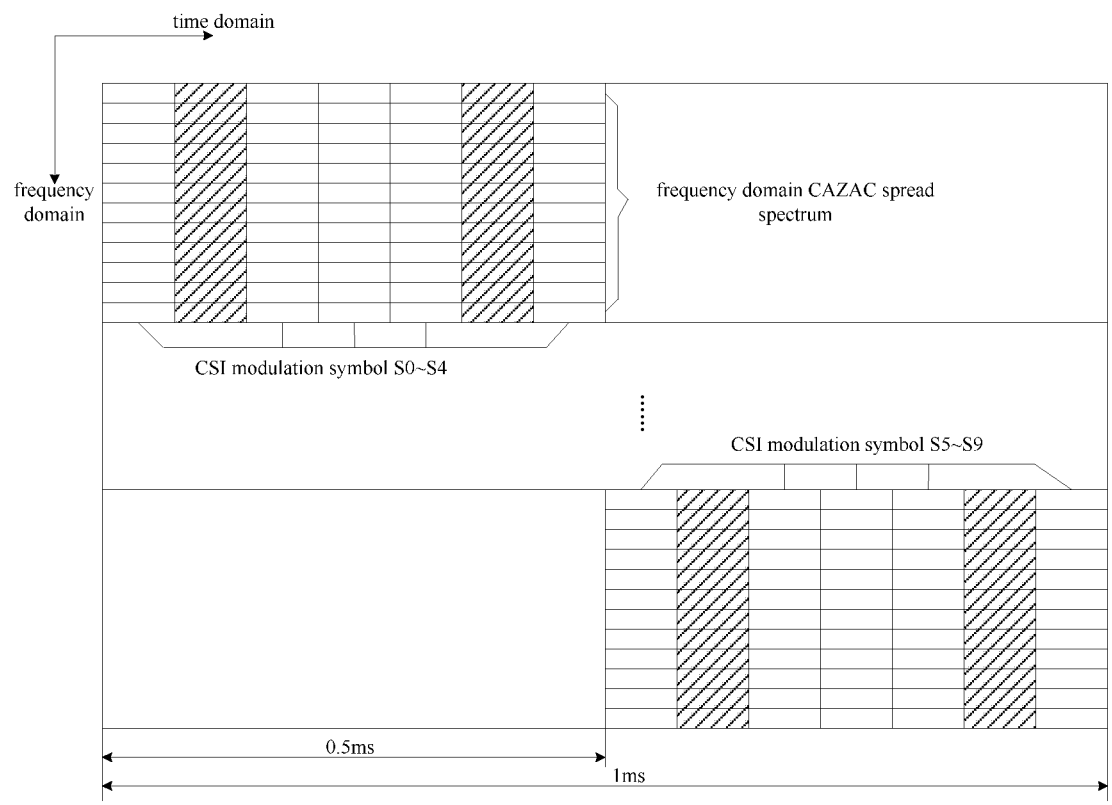
FIG. 2 is a structural schematic diagram of PUCCH format 2/2a/2b according to related art.
Figure 3:
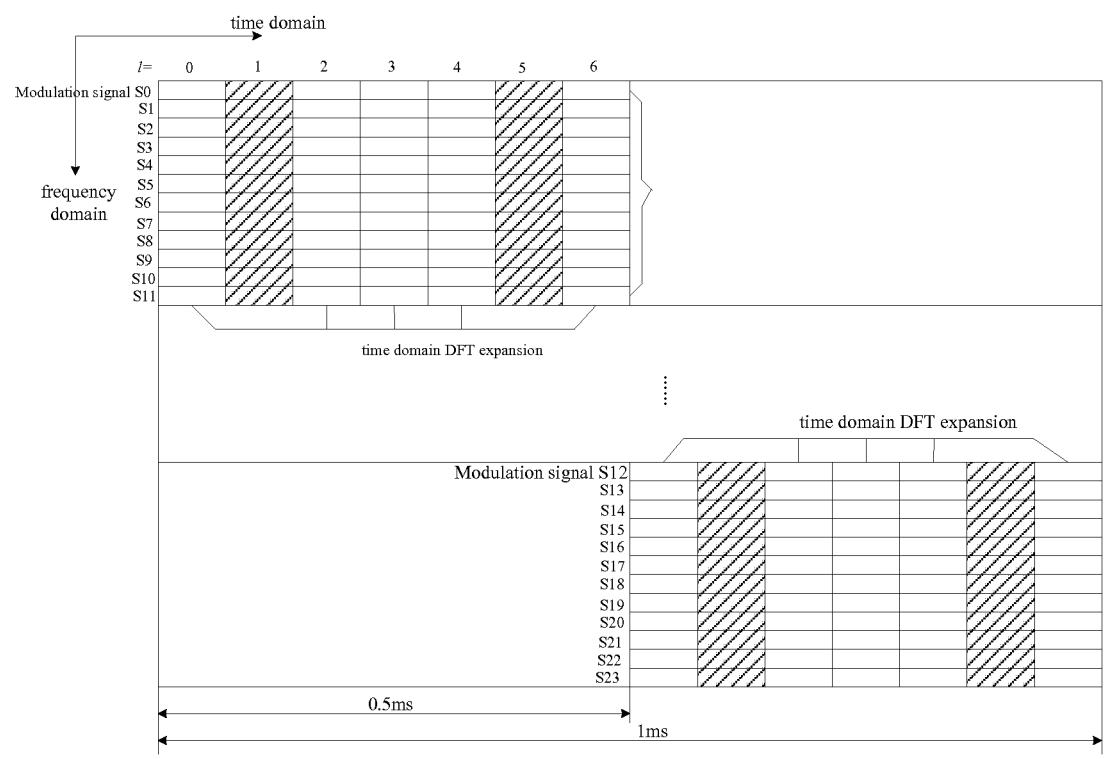
FIG. 3 is a structural schematic diagram of a PUCCH format 3 according to related art.
Figure 4:
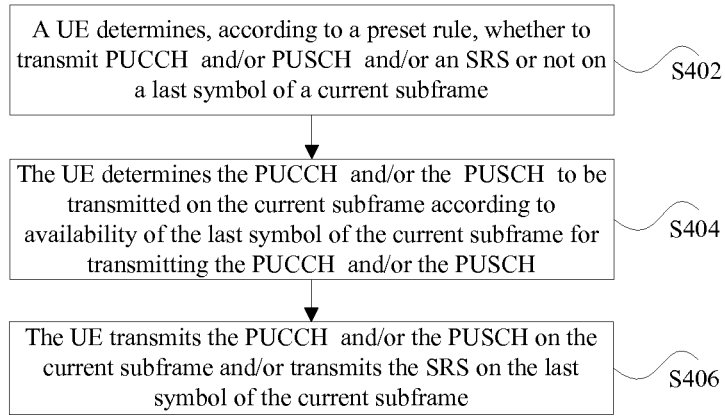
FIG. 4 is a flowchart of a method for transmitting data according to an embodiment of the present disclosure.

The present disclosure provides a method for transmitting data. FIG. 4 is a flowchart of the method for transmitting data according to an embodiment of the present disclosure. As shown in FIG. 4, the method for transmitting data comprises step S402 to step S406 as follows.

Step S402, a UE determines, according to a preset rule, whether to transmit PUCCH data and/or PUSCH data or a SRS or not on a last symbol of a current subframe.

Step S404, the UE determines the PUCCH data and/or the PUSCH data to be transmitted on the current subframe according to availability of the last symbol of the current subframe for transmitting the PUCCH data and/or the PUSCH data.

Step S406, the UE transmits the PUCCH data and/or the PUSCH data on the current subframe and/or transmits the SRS on the last symbol of the current subframe.

Preferably, the UE determining, according to the preset rule, whether to transmit the PUCCH data or the PUSCH data or the SRS or not on the last symbol of the current subframe (rule 1) comprises that: the UE determines not to transmit the PUSCH on the last symbol of the current subframe when the current subframe is a subframe that is configured by a higher-layer of a component carrier where the PUSCH is located, cell-specific and configured to transmit the SRS.

Preferably, the UE determining, according to the preset rule, whether to transmit the PUCCH data and/or the PUSCH data or the SRS or not on the last symbol of the current subframe (rule 2) comprises that: the UE determines not to transmit the PUSCH on the last symbol of the current subframe when the current subframe is a subframe that is configured by a higher-layer of a component carrier where the PUSCH is located, cell-specific and configured to transmit the SRS, and a resource allocation of the PUSCH overlaps an SRS bandwidth configuration which is cell-specific and configured by a higher-layer of the component carrier.

Preferably, the UE determining, according to the preset rule, whether to transmit the PUCCH data and/or the PUSCH data or the SRS or not on the last symbol of the current subframe (rule 3) comprises that: the UE determines not to transmit the PUSCH on the last symbol of the current subframe when the current subframe is a subframe that is configured by a higher-layer of a component carrier where the PUSCH is located or of other component carrier other than the component carrier where the PUSCH is located among component carriers of the UE, cell-specific and configured to transmit the SRS.

Preferably, the UE determining, according to the preset rule, whether to transmit the PUCCH data and/or the PUSCH data or the SRS or not on the last symbol of the current subframe (rule 4) comprises that: the UE determines not to transmit the PUCCH on the last symbol of the current subframe when the PUCCH is of format 1/1a/1b/3, a higher-layer configured parameter by which the UE allows an ACK/NACK and an SRS to be simultaneously transmitted is TRUE, and when the current subframe is a subframe that is configured by a higher-layer of a primary component carrier of the UE, cell-specific, and configured to transmit the SRS.

Preferably, the UE determining the PUCCH data and/or the PUSCH data to be transmitted on the current subframe according to availability of the last symbol of the current subframe for transmitting the PUCCH data and/or the PUSCH data comprises that: when the last symbol of the current subframe is unable to transmit the PUSCH, the UE setting $N_{SRS}$ to be 1 when determining the number of time domain symbols occupied by transmitting the PUSCH; otherwise, the UE setting the $N_{SRS}$ to be 0, wherein the $N_{SRS}$ is a variable representing whether the current subframe needs to transmit the SRS; and when the last symbol of the current subframe is unable to transmit the PUCCH format 1/1a/1b/3, the PUCCH transmitting the PUCCH data on the current subframe with a shortened format, otherwise, transmitting the PUCCH data with a normal format.

Preferably, the UE determines the number of the time domain symbols occupied by transmitting the PUSCH data by a formula as follows to calculate: $N_{symb}^{PUSCH\text{-}initial}=(2\cdot(N_{symb}^{UL}-1)-N_{SRS})$, where $N_{symb}^{PUSCH\text{-}initial}$ is the number of the time domain symbols occupied by transmitting the PUSCH, and $N_{symb}^{UL}$ is the number of symbols capable of being transmitted in one time slot.

Preferably, the UE determining, according to the preset rule, whether to transmit the PUCCH data and/or the PUSCH data or the SRS or not on the last symbol of the current subframe (rule 5) comprises that: the UE transmits the SRS having a high priority on the last symbol of the current subframe according to a preset priority rule when the UE simultaneously transmits SRSs on a plurality of uplink component carriers on the current subframe, and no PUSCH data and/or PUCCH data of the UE is transmitted on the last symbol of the current subframe.

Preferably, the UE determining, according to the preset rule, whether to transmit the PUCCH data and/or the PUSCH data or the SRS or not on the last symbol of the current subframe (rule 5) comprises that: the UE transmits one SRS having a highest priority on the last symbol of the current subframe according to a preset priority rule when the UE simultaneously transmits SRSs on a plurality of uplink component carriers on the current subframe, and no PUSCH data and/or PUCCH data of the UE is transmitted on the last symbol of the current subframe in a Long Term Evolution Advanced (LTE-A) system.

Preferably, the UE determining, according to the preset rule, whether to transmit the PUCCH data and/or the PUSCH data or the SRS or not on the last symbol of the current subframe (rule 5) comprises: when the UE simultaneously transmits SRSs on a plurality of uplink component carriers on the current subframe, and no PUSCH data and/or PUCCH data of the UE is transmitted on the last symbol of the current subframe, the UE transmitting one SRS with a highest priority on the last symbol of the current subframe according to a preset priority rule; when the UE is configured by a higher-layer signaling to allow simultaneously transmitting n SRSs on the last symbol of the subframe, the UE transmitting the n SRSs having a high priority on the last symbol of the current subframe according to a preset priority rule, wherein n is an integer greater than 1; and alternatively, when the UE is configured by the higher-layer signaling to not allow simultaneously transmitting the n SRSs on the last symbol of the subframe, the UE transmitting one SRS having a highest priority on the last symbol of the current subframe according to a preset priority rule.

Preferably, the UE is configured by the higher-layer signaling to allow simultaneously transmitting the n SRSs on the last symbol of the subframe comprises one of the following: the higher-layer signaling being a higher-layer signaling newly added to a LTE-A system, or the higher-layer signaling being a higher-layer signaling that has been defined by the LTE-A system and is configured to instruct to allow simultaneously transmitting a PUSCH and a PUCCH; instructing to allow the UE to simultaneously transmit n SRSs by setting a higher-layer signaling, which is configured to instruct to allow simultaneously transmitting the PUSCH and the PUCCH, to be TRUE or ON; and instructing that the UE can only transmit one SRS by setting a higher-layer signaling, which is configured to instruct to allow simultaneously transmitting the PUSCH and the PUCCH, to be FALSE or OFF.

Preferably, the preset priority rule (priority rule 1) comprises: a priority of an uplink component carrier is set to be a priority of transmitting an SRS on a corresponding component carrier.

Preferably, the preset priority rule (priority rule 2) comprises at least one of the following: a priority of an aperiodic SRS is preferentially set to be higher than a priority of a periodic SRS; secondly, a priority of an SRS on a primary uplink component carrier is set to be higher than a priority of other component carriers on the primary uplink component; thirdly, a priority of an SRS on a component carrier, on which a PUSCH comprising a UCI is simultaneously transmitted, is set to be higher than a priority of an SRS on a component carrier on which a PUSCH simultaneously comprising no UCI is transmitted; and fourthly, a priority of an SRS on a component carrier, on which a PUSCH is simultaneously transmitted, is set to be higher than a priority of an SRS on a component carrier on which no PUSCH is simultaneously transmitted; if priorities of SRSs on a plurality of component carriers are still the same after the above priority rules are applied, priorities of the uplink component carriers are set to be priorities of SRSs on a plurality of corresponding component carriers.

Preferably, the UE determining, according to the preset rule, whether to transmit the PUCCH data and/or the PUSCH data or the SRS or not on the last symbol of the current subframe comprises that: the UE determines to transmit the PUCCH and not to transmit a periodic SRS on the current subframe when the UE simultaneously transmits PUCCH format 2/2a/2b and the periodic SRS on the current subframe.

Preferably, the UE determining, according to the preset rule, whether to transmit the PUCCH data and/or the PUSCH data or the SRS or not on the last symbol of the current subframe comprises that: the UE determines to transmit the PUCCH and not to transmit an aperiodic SRS on the current subframe when the UE simultaneously transmits PUCCH format 2/2a/2b comprising an ACK/NACK response message and the non-periodic SRS on the current subframe.

Preferably, the UE determining, according to the preset rule, whether to transmit the PUCCH data and/or the PUSCH data or the SRS or not on the last symbol of the current subframe comprises that: the UE determining not to transmit the PUCCH and to transmit an aperiodic SRS on the current subframe when the UE simultaneously transmits a PUCCH format 2 comprising no ACK/NACK response message and the non-periodic SRS on the current subframe.

Preferably, the UE determining, according to the preset rule, whether to transmit the PUCCH data and/or the PUSCH data or the SRS or not on the last symbol of the current subframe comprises that: the UE determines to transmit the PUSCH data or the PUCCH data on the current subframe and not to transmit the SRS on the last symbol of the current subframe when the UE simultaneously transmits PUSCH or PUCCH format 1/1a/1b/3 and the SRS on the current subframe and the last symbol of the current subframe is configured to transmit the PUSCH data or the PUCCH format 1/1a/1b/3 of the UE.

Preferably, the UE determining, according to the preset rule, whether to transmit the PUCCH data and/or the PUSCH data or the SRS or not on the last symbol of the current subframe comprises that: the UE determining to transmit the PUSCH data or the PUCCH data on a symbol other than the last symbol of the current subframe, and to transmit the SRS on the last symbol of the current subframe, when the UE simultaneously transmits PUSCH or PUCCH format 1/1a/1b/3 and the SRS on the current subframe and the last symbol of the current subframe is not configured to transmit the PUSCH data or the format 1/1a/1b/3 of the PUCCH data of the UE.

Preferably, the UE determining, according to the preset rule, whether to transmit the PUCCH data and/or the PUSCH data or the SRS or not on the last symbol of the current subframe comprises that: when the UE simultaneously transmits a PUCCH, a PUSCH and the SRS on the current subframe, and a higher-layer signaling configured to instruct to allow simultaneously transmitting the PUSCH and the PUCCH is TRUE or ON, the UE firstly determining transmission of the PUCCH and the SRS in accordance with a processing method of transmitting the PUCCH and the SRS on the same subframe; if the last symbol of the subframe still needs to transmit the SRS after the above processing, further determining transmission of the PUSCH and the SRS in accordance with a processing method of transmitting the PUSCH and the SRS on the same subframe.

Preferably, determining transmission of the PUSCH and the SRS in accordance with the processing method of transmitting the PUSCH and the SRS on the same subframe comprises that: the UE determining to transmit the PUCCH and not to transmit a periodic SRS on the current subframe when the UE simultaneously transmits PUCCH format 2/2a/2b and the periodic SRS on the current subframe; the UE determining to transmit the PUCCH and not to transmit an aperiodic SRS on the current subframe when the UE simultaneously transmits the PUCCH format 2/2a/2b comprising an ACK/NACK response message and the non-periodic SRS on the current subframe; the UE determining not to transmit the PUCCH, and to transmit the non-periodic SRS on the current subframe when the UE simultaneously transmits a PUCCH format 2 comprising no ACK/NACK response message and the non-periodic SRS on the current subframe; the UE determining to transmit the PUCCH data on the current subframe, and not to transmit the SRS on the last symbol of the current subframe when the UE simultaneously transmits the PUCCH format 1/1a/1b/3 and the SRS on the current subframe and the last symbol of the current subframe is configured to transmit PUCCH format 1/1a/1b/3 of the UE; and the UE determining to transmit the PUCCH data on a symbol other than the last symbol of the current subframe, and to transmit the SRS on the last symbol of the current subframe when the UE simultaneously transmits the PUCCH format 1/1a/1b/3 and the SRS on the current subframe and the last symbol of the current subframe is not configured to transmit the PUCCH format 1/1a/1b/3 of the UE.

Preferably, the UE determining, according to the preset rule, whether to transmit the PUCCH data and/or the PUSCH data or the SRS or not on the last symbol of the current subframe comprises: when the UE simultaneously transmits the PUCCH, the PUSCH and the SRS on the current subframe and the higher-layer signaling that is configured to instruct to allow simultaneously transmitting the PUSCH and the PUCCH is FALSE or OFF, the UE firstly transmits UCI information carried by the PUCCH on the PUSCH; and the UE determines transmission of the PUSCH and the SRS in accordance with a processing method of transmitting the PUSCH and the SRS on the same subframe.

Preferably, the determining transmission of the PUSCH and the SRS in accordance with the processing method of transmitting the PUSCH and the SRS on the same subframe comprises that: the UE determines to transmit the PUSCH data on the current subframe and not to transmit the SRS on the last symbol of the current subframe, when the UE simultaneously transmits the PUSCH data and the SRS on the current subframe and when the last symbol of the current subframe is configured to transmit the PUSCH data of the UE; and the UE determines to transmit the PUSCH data on a symbol other than the last symbol of the current subframe and to transmit the SRS on the last symbol of the current subframe, when the UE simultaneously transmits the PUSCH data and the SRS on the current subframe and when the last symbol of the current subframe is not configured to transmit the PUSCH of the UE.

Next, the implementation processes of embodiments of the present disclosure will be described in detail in conjunction with examples.

In order to make it convenient to understand how the principles of the present disclosure are applied in practice, detailed descriptions will be given below in conjunction with exemplary embodiments.

Figure 5:
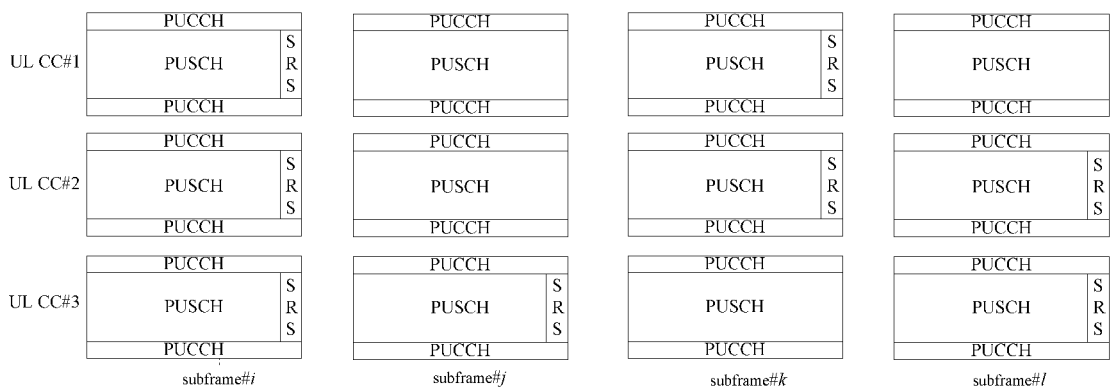
FIG. 5 is a schematic diagram of time-frequency domain positions of PUCCHs, PUSCHs and SRSs according to an embodiment of the present disclosure.

To facilitate the descriptions, as shown in FIG. 5, it is assumed that a UE is configured, through a higher-layer signaling, with a plurality of uplink component carriers UL CC#1, UL CC#2 and UL CC#3, wherein the UL CC#2 is a primary uplink component carrier (UL PCC), and wherein subframes #i/#k are subframes that are configured by a higher-layer of the UL CC#1, cell-specific and configured to transmit the SRS, subframes #i/#k/#l are subframes that are configured by a higher-layer of the UL CC#2, cell-specific and configured to transmit the SRS, and subframes #i/#j/#l are subframes that are configured by a higher-layer of the UL CC#3, and cell-specific and configured to transmit the SRS. In addition, for the sake of simple and convenient illustration, all the SRSs below comprise periodic SRSs and non-periodic SRSs if there is no specific instruction.

Embodiment 1

Figure 6:
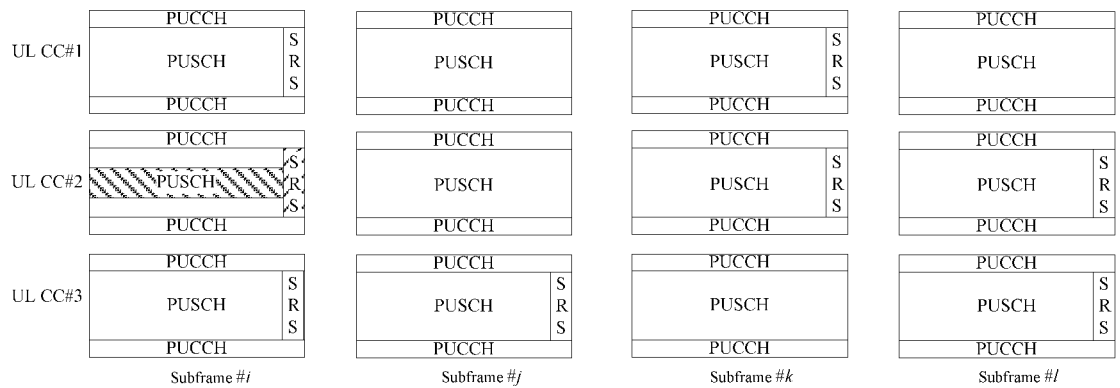
FIG. 6 is one schematic diagram of multiplexing PUSCH and SRS on the same component carrier according to an embodiment of the present disclosure.

As shown in FIG. 6, it is assumed that on a subframe #i, a UE needs to simultaneously transmit a PUSCH and an SRS on a UL CC#2. Since the subframe #i can transmit SRS, the current subframe #i necessarily is an SRS subframe that is configured by a higher-layer of the UL CC#2, and cell-specific. According to rule 1, the UE transmits no PUSCH on the last symbol of the subframe #i, and then according to rule 8, since no PUSCH is transmitted on the last symbol of the subframe #i, the UE transmits the SRS on the last symbol of the subframe #i.

Embodiment 2

Example 2-1

Figure 7:
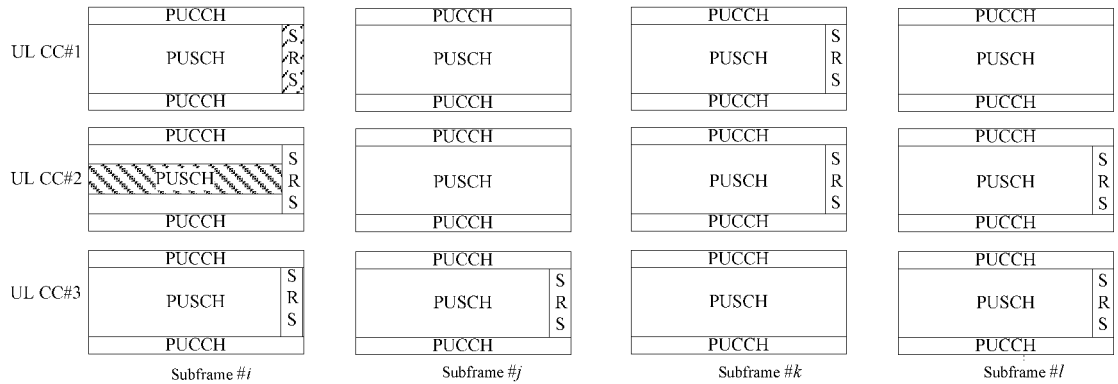
FIG. 7 is one schematic diagram of multiplexing PUSCH and SRS on different component carriers according to an embodiment of the present disclosure.

As shown in FIG. 7, it is assumed that on a subframe #i, a UE needs to transmit a PUSCH on a UL CC#2, and to transmit an SRS on a UL CC#1. As for the UL CC#2, since the subframe #i is an SRS subframe that is configured by a higher-layer of the UL CC#2, and cell-specific, and it is assumed herein that a resource allocation of the PUSCH on the current UL CC#2 and a bandwidth of an SRS which is configured by a higher-layer of the UL CC#2, and cell-specific, have an overlapped part, the UE transmits no PUSCH on the last symbol of the subframe #i according to rule 2, and then according to rule 8, since no PUSCH is transmitted on the last symbol of the subframe #i, the UE transmits the SRS on the UL CC#1 on the last symbol of the subframe #i.

Example 2-2

Figure 8:
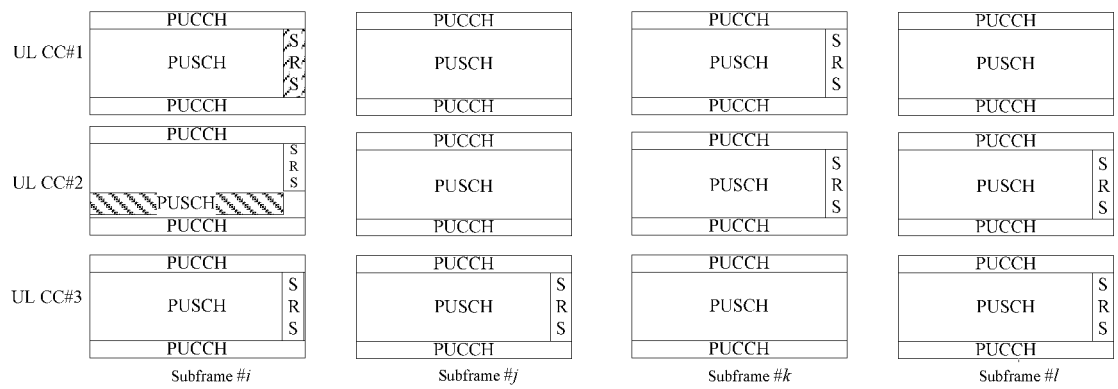
FIG. 8 is another schematic diagram of multiplexing PUSCH and SRS on different component carriers according to an embodiment of the present disclosure.

As shown in FIG. 8, it is assumed that on a subframe #i, a UE needs to transmit a PUSCH on a UL CC#2, and to transmit an SRS on a UL CC#1. As for the UL CC#2, since the subframe #i is an SRS subframe that is configured by a higher-layer of the UL CC#2, and cell-specific, and it is assumed herein that a resource allocation of the PUSCH on the current UL CC#2 and a bandwidth of an SRS which is configured by a higher-layer of the UL CC#2, and cell-specific, have an overlapped part, according to rule 2, the UE transmits the PUSCH on the last symbol of the subframe #i, and then according to rule 7, since there is the PUSCH transmitted on the last symbol of the subframe #i, the SRS on the UL CC#1 is wiped off and not transmitted.

Example 2-3

Figure 9:
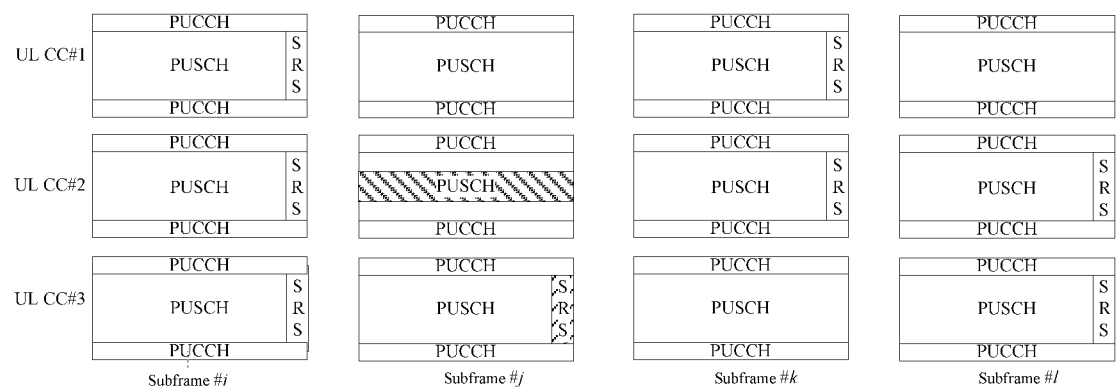
FIG. 9 is another schematic diagram of multiplexing PUSCH and SRS on different component carriers according to an embodiment of the present disclosure.

As shown in FIG. 9, it is assumed that on a subframe #j, a UE needs to transmit a PUSCH on a UL CC#2, and to transmit an SRS on a UL CC#3. As for the UL CC#2, since the subframe #j is not an SRS subframe that is configured by a higher-layer of the UL CC#2, and cell-specific, according to 1, the UE transmits the PUSCH on the last symbol of the subframe #j, and then according to rule 7, since there is the PUSCH transmitted on the last symbol of the subframe #j, the SRS on the UL CC#3 is wiped off and not transmitted.

Example 2-4

Figure 10:
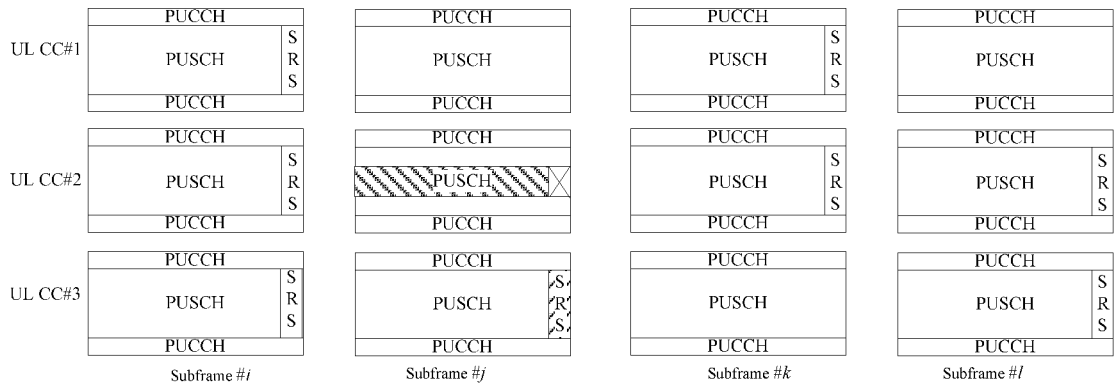
FIG. 10 is another schematic diagram of multiplexing PUSCH and SRS on different component carriers according to an embodiment of the present disclosure.

As shown in FIG. 10, it is assumed that on a subframe #j, a UE needs to transmit a PUSCH on a UL CC#2, and to transmit an SRS on a UL CC#3. As for the UL CC#2, though the subframe #j is not an SRS subframe that is configured by a higher-layer of the UL CC#2 and cell-specific, the subframe #j is an SRS subframe that is configured by a higher-layer of the UL CC#3 and cell-specific. Then according to rule 3, the UE transmits no PUSCH on the last symbol of the subframe #j, and then according to rule 8, since there is no PUSCH transmitted on the last symbol of the subframe #j, the UE transmits the SRS on the UL CC#3 on the last symbol of the subframe #j.

Embodiment 3

Example 3-1

Figure 11:
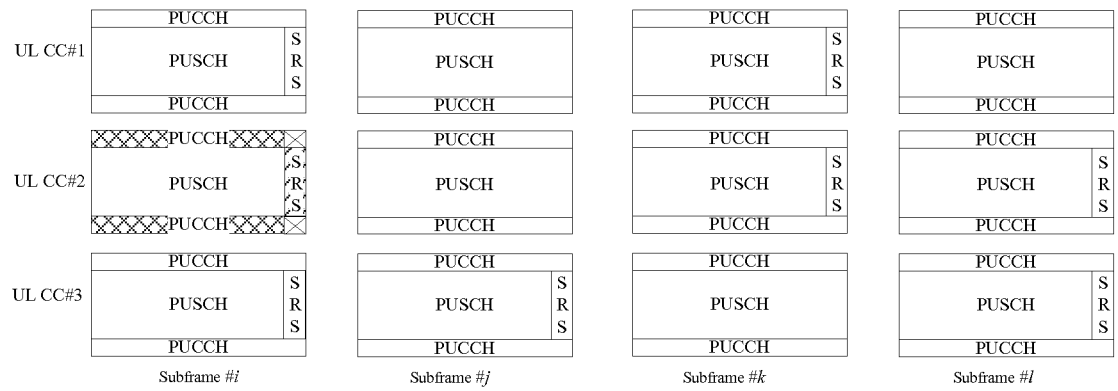
FIG. 11 is a schematic diagram of multiplexing PUCCH and SRS on the same component carrier according to an embodiment of the present disclosure.

As shown in FIG. 11, it is assumed that on a subframe #i, a UE needs to simultaneously transmit PUCCHs and an SRS on a UL CC#2, the PUCCHs are one of PUCCH format 1/1a/1b/3, and a higher-layer configured parameter Simultaneous-AN-and-SRS is TRUE. According to rule 4, the UE transmits the PUCCHs on the subframe #i by using a shortened format, i.e. no PUCCH is transmitted on the last symbol of the subframe #i, and then according to rule 8, since no PUCCH is transmitted on the last symbol of the subframe #i, the UE transmits the SRS on the last symbol of the subframe #i.

Example 3-2

Figure 12:
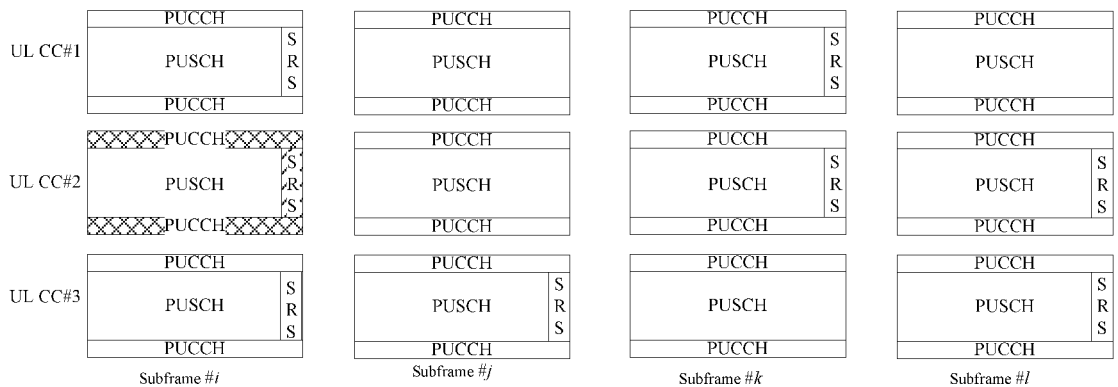
FIG. 12 is another schematic diagram of multiplexing PUCCH and SRS on the same component carrier according to an embodiment of the present disclosure.

As shown in FIG. 12, it is assumed that on a subframe #i, a UE needs to simultaneously transmit PUCCHs and an SRS on a UL CC#2, the PUCCHs are one of PUCCH format 1/1a/1b/3, and a higher-layer configured parameter Simultaneous-AN-and-SRS is FALSE. According to rule 4, the UE transmits the PUCCHs on the subframe #i by using a normal format, i.e. there are PUCCHs transmitted on the last symbol of the subframe #i, and then according to rule 7, since there are PUCCHs transmitted on the last symbol of the subframe #i, the UE wipes off and does not transmit the SRS on the UL CC#2.

Embodiment 4

Example 4-1

Figure 13:
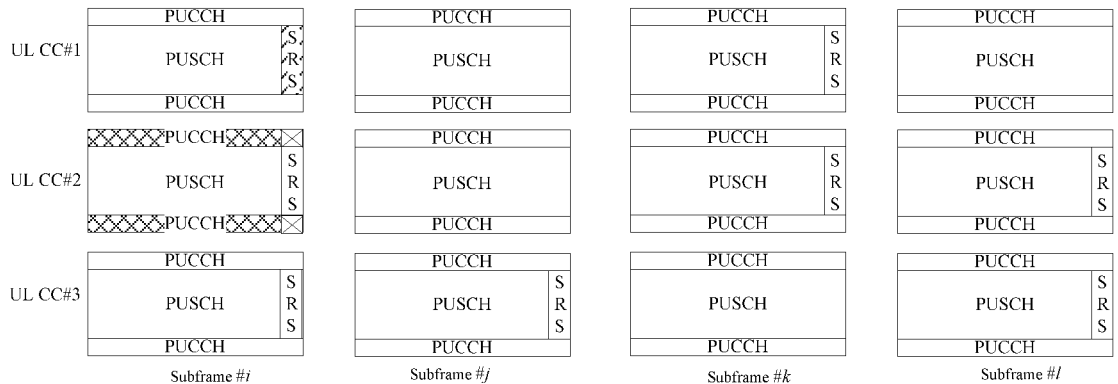
FIG. 13 is a schematic diagram of multiplexing PUCCH and SRS on the same component carrier according to an embodiment of the present disclosure.

As shown in FIG. 13, it is assumed that on a subframe #i, a UE needs to transmit PUCCHs on a UL CC#2 and to transmit an SRS on a UL CC#1, the PUCCHs are one of PUCCH format 1/1a/1b/3, and a higher-layer configured parameter Simultaneous-AN-and-SRS is TRUE. Since the subframe #i is an SRS subframe that is configured by a higher-layer of the UL CC#2 and is cell-specific, according to rule 4, the UE transmits the PUCCHs on the UL CC#2 on the subframe #i by using a shortened format, i.e. no PUCCH is transmitted on the last symbol of the subframe #i, and then according to rule 8, since no PUCCH is transmitted on the last symbol of the subframe #i, the UE transmits the SRS on the UL CC#1 on the last symbol of the subframe #i.

Example 4-2

Figure 14:
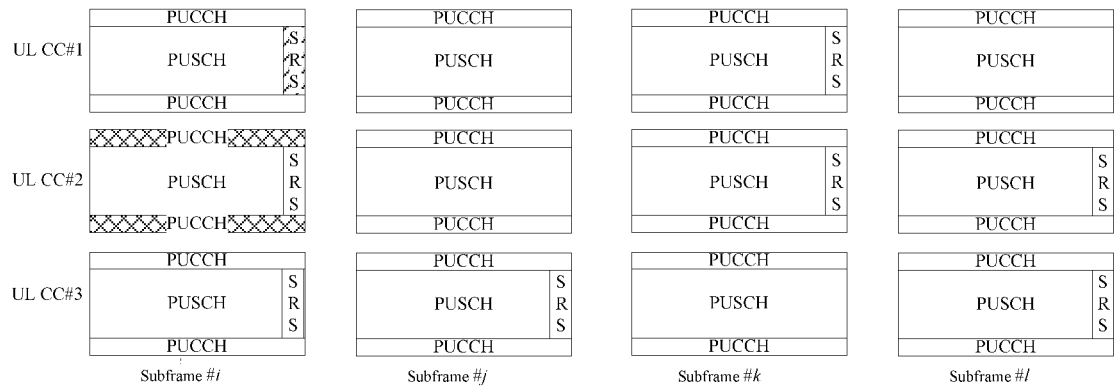
FIG. 14 is another schematic diagram of multiplexing PUCCH and SRS on different component carriers according to an embodiment of the present disclosure.

As shown in FIG. 14, it is assumed that on a subframe #i, a UE needs to transmit PUCCHs on a UL CC#2 and to transmit an SRS on a UL CC#1, the PUCCHs are one of PUCCH format 1/1a/1b/3, and a higher-layer configured parameter Simultaneous-AN-and-SRS is FALSE. According to rule 4, the UE transmits the PUCCHs on the UL CC#2 on the subframe #i by using a normal format, i.e. there are PUCCHs transmitted on the last symbol of the subframe #i, and then according to rule 7, since there are PUCCHs transmitted on the last symbol of the subframe #i, the UE wipes off and does not transmit the SRS on the UL CC#1.

Example 4-3

Figure 15:
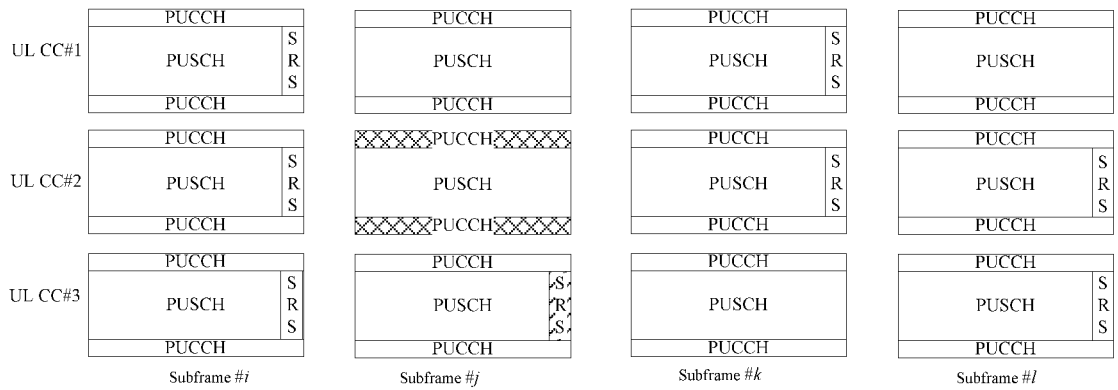
FIG. 15 is another schematic diagram of multiplexing PUCCH and SRS on different component carriers according to an embodiment of the present disclosure.

As shown in FIG. 15, it is assumed that on a subframe #j, a UE needs to transmit PUCCHs on a UL CC#2 and to transmit an SRS on UL CC#2, and the PUCCHs are one of PUCCH format 1/1a/1b/3. Since the subframe #j is not an SRS subframe that is configured by a higher-layer of primary uplink component carrier UL CC#2, and cell-specific, according to rule 4, the UE transmits the PUCCHs on the UL CC#2 on the subframe #i by using a normal format, i.e. there are PUCCHs transmitted on the last symbol of the subframe #j, and then according to rule 7, since there are PUCCHs transmitted on the last symbol of the subframe #j, the UE wipes off and does not transmit the SRS on the UL CC#3.

Embodiment 5

Example 5-1

As shown in FIG. 12, it is assumed that on a subframe #i, a UE needs to simultaneously transmit PUCCHs and a periodic SRS on a UL CC#2, and the PUCCHs are one of PUCCH format 2/2a/2b. According to rule 6, the UE transmits the PUCCHs on the subframe #i, and then according to rule 7, since there are PUCCHs transmitted on the last symbol of the subframe #i, the UE wipes off and does not transmit the SRS on the UL CC#2.

Example 5-2

As shown in FIG. 12, it is assumed that on a subframe #i, a UE needs to simultaneously transmit PUCCHs and an aperiodic SRS on a UL CC#2, and the PUCCHs are PUCCH format 2a or 2b or PUCCH format 2 comprising ACK/NACK transmission. According to rule 6, since the PUCCHs comprise the ACK/NACK transmission, the UE transmits the PUCCHs on the subframe #i, and then according to rule 8, since there are PUCCHs transmitted on the last symbol of the subframe #i, the UE wipes off and does not transmit the SRS on the UL CC#2.

Example 5-3

As shown in FIG. 12, it is assumed that on a subframe #i, a UE needs to simultaneously transmit PUCCHs and an aperiodic SRS on a UL CC#2, and the PUCCHs are PUCCH format 2a comprising no ACK/NACK transmission. According to rule 6, since the PUCCHs comprise no ACK/NACK transmission, the UE transmits no PUCCH on the subframe #i, and then according to rule 8, since no PUCCH is transmitted on the last symbol of the subframe #i, the UE transmits the SRS on the UL CC#2 on the last symbol of the subframe #i.

Embodiment 6

Example 6-1

As shown in FIG. 14, it is assumed that on a subframe #i, a UE needs to transmit PUCCHs on a UL CC#2 and at the same time to transmit a periodic SRS on a UL CC#1, and the PUCCHs are one of PUCCH format 2/2a/2b. According to rule 6, the UE transmits the PUCCHs on the UL CC#2 on the subframe #i, and then according to rule 7, since there are PUCCHs transmitted on the last symbol of the subframe #i, the UE wipes off and does not transmit the SRS on the UL CC#1.

Example 6-2

As shown in FIG. 14, it is assumed that on a subframe #i, a UE needs to transmit PUCCHs on a UL CC#2 and at the same time to transmit an aperiodic SRS on a UL CC#1, and the PUCCHs are PUCCH format 2a or 2b or PUCCH format 2 comprising ACK/NACK transmission. According to rule 6, since all the PUCCHs comprise the ACK/NACK transmission, the UE transmits the PUCCHs on the UL CC#2 on the subframe #i, and then according to rule 7, since there are PUCCHs transmitted on the last symbol of the subframe #i, the UE wipes off and does not transmit the SRS on the UL CC#1.

Example 6-3

As shown in FIG. 13, it is assumed that on a subframe #i, a UE needs to transmit PUCCHs on a UL CC#2 and at the same time to transmit an aperiodic SRS on a UL CC#1, and the PUCCHs are PUCCCH format 2 comprising no ACK/NACK transmission. According to rule 6, since the PUCCHs comprise no ACK/NACK transmission, the UE transmits no PUCCH on the UL CC#2 on the subframe #i, and then according to rule 8, since no PUCCH is transmitted on the last symbol of the subframe #i, the UE transmits the SRS on the UL CC#1 on the last symbol of the subframe #i.

Embodiment 7

Example 7-1: when a higher-layer configured parameter Simultaneous-PUCCH-and-PUSCH of the UE is TRUE, i.e. a PUCCH and a PUSCH are allowed to be simultaneously transmitted, the UE comprehensively uses the same processing modes as that of the exemplary embodiments 1, 3 and 5 to determine transmission of the PUCCH, the PUSCH and the SRS.

Example 7-2: when a higher-layer configured parameter Simultaneous-PUCCH-and-PUSCH of the UE is FALSE, i.e. a PUCCH and a PUSCH are not allowed to be simultaneously transmitted, a UCI carried by a PUCCH is placed and transmitted on a PUSCH, namely, only the PUSCH and the PUSCH are simultaneously transmitted on the current subframe. At this time, the PUSCH and the SRS are simultaneously transmitted on the same component carrier, and thus, the UE uses the same processing mode as that of the exemplary embodiment 1 to determine transmission of the PUSCH and the SRS.

Embodiment 8

Example 8-1: when a higher-layer configured parameter Simultaneous-PUCCH-and-PUSCH of the UE is TRUE, i.e. a PUCCH and a PUSCH are allowed to be simultaneously transmitted, if a PUCCH and a PUSCH to be transmitted on the current subframe are on the same component carrier, and an SRS is on another component carrier, or the PUCCH, the PUSCH and the SRS are on different component carriers, the UE comprehensively uses the same processing modes as that of the exemplary embodiments 2, 4 and 6 to determine transmission of the PUCCH, the PUSCH and the SRS.

Example 8-2: when a higher-layer configured parameter Simultaneous-PUCCH-and-PUSCH of the UE is TRUE, i.e. a PUCCH and a PUSCH are allowed to be simultaneously transmitted, if a PUCCH and an SRS to be transmitted on the current subframe are on the same component carrier, and the PUSCH is on another component carrier, the UE comprehensively uses the same processing modes as that of the exemplary embodiments 2, 3 and 5 to determine transmission of the PUCCH, the PUSCH and the SRS.

Example 8-3: when a higher-layer configured parameter Simultaneous-PUCCH-and-PUSCH of the UE to be TRUE, i.e. a PUCCH and a PUSCH are allowed to be simultaneously transmitted, if a PUCCH and an SRS to be transmitted on the current subframe are on the same component carrier, and a PUCCH is on another component carrier, the UE comprehensively uses the same processing modes as that of the exemplary embodiments 1, 4 and 6 to determine transmission of the PUCCH, the PUSCH and the SRS.

Example 8-4: when a higher-layer configured parameter Simultaneous-PUCCH-and-PUSCH of the UE is FALSE, i.e. a PUCCH and a PUSCH are not allowed to be simultaneously transmitted, at this time, a UCI carried by the PUCCH is transmitted on the PUSCH. If a PUSCH and an SRS to be transmitted on the current subframe are on different component carriers, the UE uses the same processing mode as that of the exemplary embodiment 2 to determine transmission of the PUSCH and the SRS. If the PUSCH and the SRS to be transmitted by the current subframe are on the same subframe (for this scenario, the original PUSCH and the PUCCH necessarily are not on the same component carrier), the UE uses the same processing mode as that of the exemplary embodiment 1 to determine transmission of the PUSCH and the SRS.

Embodiment 9

Example 9-1: when the UE is configured by a higher-layer signaling to allow simultaneously transmitting a plurality of SRSs, the UE transmits SRSs on the plurality of component carriers on the last symbol of the subframe.

Example 9-2: when the UE is configured by a higher-layer signaling not to allow simultaneously transmitting a plurality of SRSs, the UE transmits, according to a predefined priority principle, an SRS on a component carrier having a highest priority on the last symbol of the subframe.

Example 9-2-1: it is assumed that a UE uses the above priority principle 1 when performing SRS selection, and meanwhile it is assumed that priorities of UL CC#1/2/3 are UL CC#2>UL CC#1>UL CC#3 in sequence.

Figure 16:
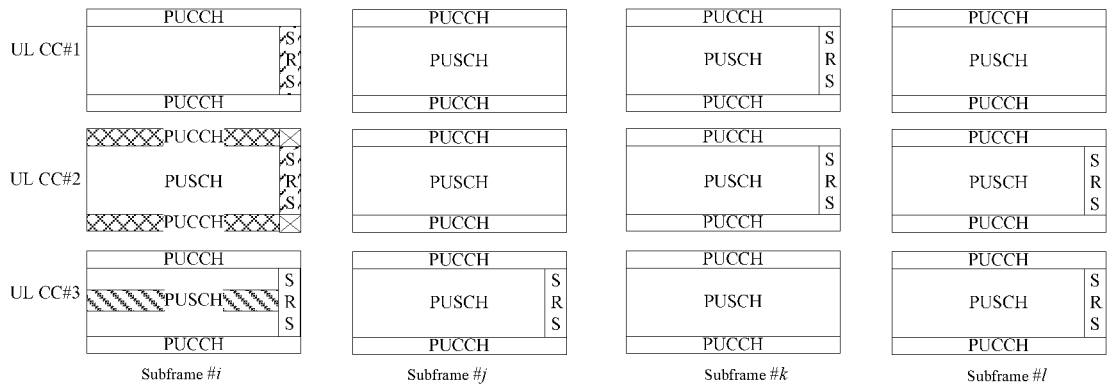
FIG. 16 is a schematic diagram of simultaneously transmitting a plurality of SRSs on different component carriers according to an embodiment of the present disclosure.

As shown in FIG. 16, the UE needs to transmit SRSs on the UL CC#1 and the UL CC#2 on the last symbol of the subframe #i, but a higher-layer configured signaling of the UE does not allow simultaneously transmitting a plurality of SRSs, and thus, according to the priority principle 1, in component carriers that need to transmit the SRSs, since the UL CC#2 has the highest priority, the UE transmits the SRS on the UL CC#2 on the last symbol of the subframe #i, and wipes off and does not transmit the SRS on the UL CC#1, regardless whether the SRS on the UL CC#1 is a periodic SRS or an aperiodic SRS at this time.

Example 9-2-2: it is assumed that a UE uses the above priority principle 2 when performing SRS selection.

As show in FIG. 16, it is assumed that the UE needs to transmit an aperiodic SRS on a UL CC#1 and a periodic SRS on a UL CC#2 on the last symbol of a subframe #i, but a higher-layer configured signaling of the UE does not allow simultaneously transmitting a plurality of SRSs, and thus, according to the priority principle 2, since the SRS on the UL CC#1 is an aperiodic SRS, the UE transmits the non-periodic SRS on the UL CC#1 on the last symbol of the subframe #i and wipes off and does not transmit the SRS on the UL CC#2.

Example 9-2-3: it is assumed that a UE uses the above priority principle 2 when performing SRS selection.

Figure 17:
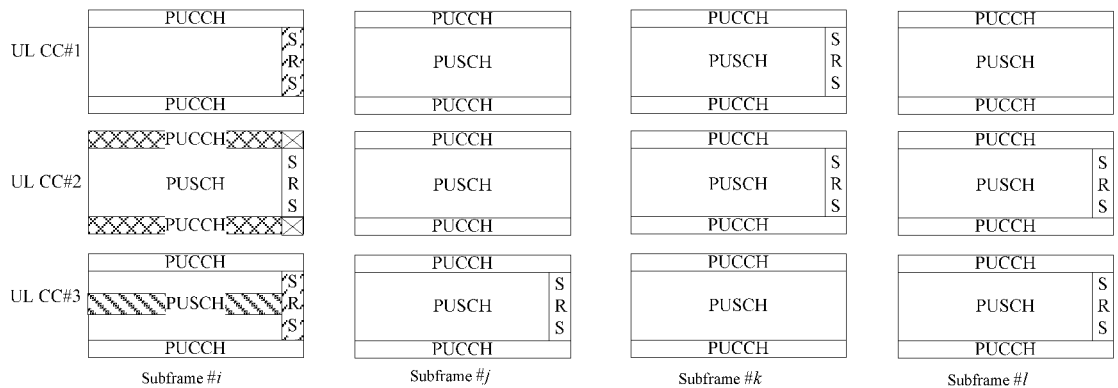
FIG. 17 is another schematic diagram of simultaneously transmitting a plurality of SRSs on different component carriers according to an embodiment of the present disclosure.

As shown in FIG. 17, it is assumed that the UE needs to transmit SRSs of the same type (both SRSs are periodic SRSs or non-periodic SRSs) on a UL CC#1 and a UL CC#3 on the last symbol of subframe #i, but a higher-layer configured signaling of the UE does not allow simultaneously transmitting a plurality of SRSs, and thus, according to the priority principle 2, since the SRSs on the UL CC#1 and UL CC#2 are of the same type, and at the same time there is a PUSCH to be transmitted on a UL CC#3 but no PUSCH is to be transmitted on the UL CC#1, the UE transmits the SRS on the UL CC#3 on the last symbol of the subframe #i and wipes off and does not transmit the SRS on the UL CC#1.

Example 9-2-4: it is assumed that a UE uses the above priority principle 2 when performing SRS selection.

Figure 18:
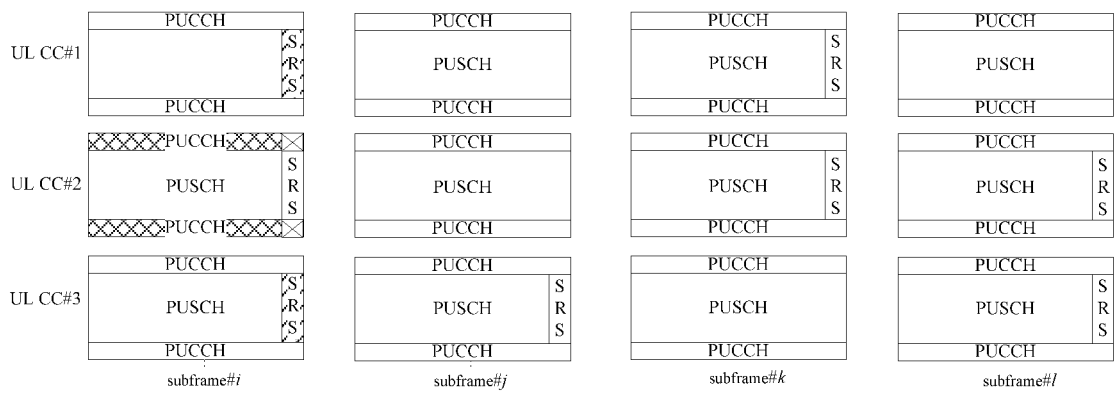
FIG. 18 is another schematic diagram of simultaneously transmitting plurality of SRSs on different component carriers according to an embodiment of the present disclosure.

As shown in FIG. 18, it is assumed that the UE needs to transmit SRSs of the same type (both SRSs are periodic SRSs or non-periodic SRSs) on a UL CC#1 and a UL CC#3 on the last symbol of subframe #i, but a higher-layer configured signaling of the UE does not allow simultaneously transmitting a plurality of SRSs, and thus, according to the priority principle 2, since the SRSs on the UL CC#1 and UL CC#2 are of the same type, and neither the UL CC#1 nor the UL CC#3 is a primary uplink component carrier, and at the same time, both have a PUSCH to be transmitted, at which time, the UE needs to choose one SRS on the UL CC#1 and the UL CC#3 having a higher priority to transmit. Since the component carriers have priorities of UL CC#1>UL CC#3, the UE transmits the SRS on the UL CC#1 on the last symbol of the subframe #i and wipes off and does not transmit the SRS on the UL CC#3.

Example 9-2-5: it is assumed that a UE uses the above priority principle 2 when performing SRS selection.

As shown in FIG. 18, it is assumed that the UE needs to transmit SRSs of the same type (both are periodic SRS or non-periodic SRS) on a UL CC#1 and a UL CC#3 on the last symbol of a subframe #i, but a higher-layer configured signaling of the UE does not allow simultaneously transmitting a plurality of SRSs, and thus, according to priority principle 2, since the SRSs on the UL CC#1 and UL CC#2 are of the same type, and neither the UL CC#1 nor the UL CC#3 is a primary uplink component carrier, and at the same time, both have a PUSCH to be transmitted, but it is assumed that the PUSCH on the UL CC#1 carries a UCI, at which time, the UE transmits the SRS on the UL CC#1 on the last symbol of the subframe #i and wipes off and does not transmit the SRS on the UL CC#3.

It should be indicated that steps shown in the flow chart of the figure can be implemented in a computer system with a set of computer executable instructions, and though a logical order is shown in the flow chart, the steps shown or described can be implemented in an order different from that herein in some cases.

Figure 19:
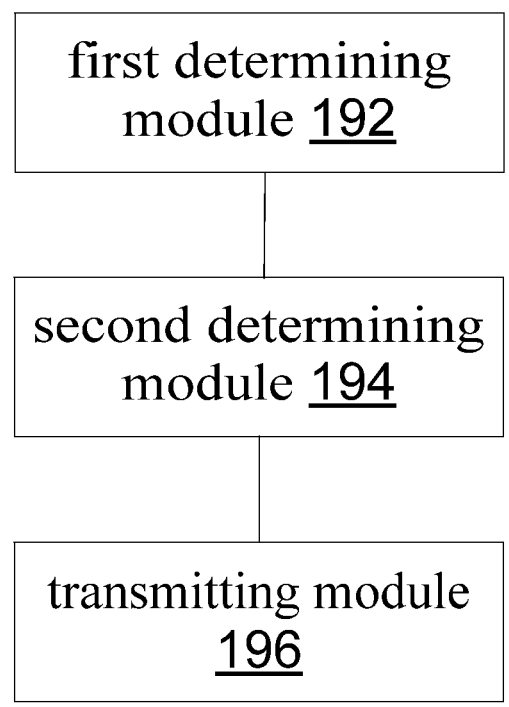
FIG. 19 is a structure block diagram of a device for transmitting data according to an embodiment of the present disclosure.

A device for transmitting data is provided in one embodiment of the present disclosure. The device for transmitting data can be adapted to implement the above method for transmitting data. FIG. 19 is a structure block diagram of a device for transmitting data according to an embodiment of the present disclosure. As shown in FIG. 19, the device for transmitting data comprises a first determining module 192, a second determining module 194 and a transmitting module 196. The structure of the device for transmitting data will be described in detail below.

The first determining module 192 is configured to determine, according to a preset rule, whether to transmit PUCCH data and/or PUSCH data and/or SRSs or not on the last symbol of a current subframe; the second determining module 194 is configured to determine the PUCCH data and/or the PUSCH data to be transmitted on the current subframe according to availability of the last symbol of the current subframe for transmitting the PUCCH data and/or the PUSCH data; and the transmitting module 196 is configured to transmit the PUCCH data and/or the PUSCH data on the current subframe and/or to transmit the SRSs on the last symbol of the current subframe.

It should be indicated that the device for transmitting data described in the device embodiment is corresponding to the above method embodiments, and a specific implementation process thereof has been described in detail in the method embodiments, and unnecessary details will not be given herein.

To sum up, a method and device for transmitting data are provided according to the above embodiments of the present disclosure. According to different preset rules, the PUCCH data and/or the PUSCH data and/or the SRSs are transmitted in the present disclosure, and it can be realized that a plurality of types of physical uplink signals/channels can be simultaneously transmitted.

Obviously, those skilled in the art shall understand that individual modules or individual steps of the present disclosure can be implemented with general computing devices, they may be integrated in a single computing device or distributed in network formed by a plurality of computing devices, optionally, they may be implemented by using program codes executable by computing devices, thus they may be stored in memory devices for execution by the computing devices, or implemented by making them into integrated circuit module respectively, or by making several modules or steps in to a single IC. Thus, the present disclosure is not limited to any particular combination of hardware and software.

The above mentioned is merely the preferred embodiments of the present disclosure but not to limit the present disclosure. Various alterations and changes to the present disclosure are apparent to those skilled in the art. Any modifications, equivalent substitutions, improvements etc. within the principle of the present disclosure should be concluded in the protection scope of the present disclosure.

What is claimed is:

1. A method for transmitting data, comprising:
   a user equipment (UE) determining, according to a preset rule, whether or not to transmit physical uplink control channel (PUCCH), physical uplink shared channel (PUSCH), the PUCCH and the PUSCH, or a sounding reference signal (SRS) on a last symbol of a current subframe;
   the UE determining the PUCCH, the PUSCH, or the PUCCH and the PUSCH to be transmitted on the current subframe according to availability of the last symbol of the current subframe for transmitting the PUCCH, the PUSCH, or the PUCCH and the PUSCH; and
   the UE transmitting:
   (a) the PUCCH, the PUSCH, or the PUCCH and the PUSCH on the current subframe,
   (b) the SRS on the last symbol of the current subframe, or
   (c) the PUCCH, the PUSCH, or the PUCCH and the PUSCH on the current subframe, and the SRS on the last symbol of the current subframe;
   wherein said preset rule comprises: when the PUCCH format is format 1/1a/1b/3, the UE determining not to transmit the PUCCH on the last symbol of the current subframe when the higher-layer configured parameter for simultaneous transmission of ACK/NACK and SRS is TRUE for the UE and when the current subframe is higher-layer configured as a cell-specific SRS subframe for the primary component carrier.

2. The method according to claim 1, wherein said preset rule further comprises:
the UE determining not to transmit the PUSCH on the last symbol of the current subframe when the current subframe is higher-layer configured as a cell-specific SRS subframe for the component carrier on which the PUSCH is transmitted.

3. The method according to claim 1, wherein said preset rule further comprises:
the UE determining not to transmit the PUSCH on the last symbol of the current subframe when the current subframe is higher-layer configured as a cell-specific SRS subframe for the component carrier on which the PUSCH is transmitted and the allocation of the PUSCH partially overlaps with the higher-layer configured cell-specific SRS bandwidth configuration.

4. The method according to claim 1, wherein said preset rule further comprises:
the UE determining not to transmit the PUSCH on the last symbol of the current subframe when the current subframe is higher-layer configured as a cell-specific SRS subframe for the component carrier on which the PUSCH is transmitted or the component carrier other than the PUSCH is transmitted.

5. The method according to claim 1, wherein said preset rule further comprises:
the UE determining to transmit the PUSCH or the PUCCH on the symbols other than the last symbol of the current subframe, and to transmit the SRS on the last symbol of the current subframe, when the UE simultaneously transmits PUSCH or PUCCH format 1/1a/1b/3 and the SRS on the current subframe and the last symbol of the current subframe is not configured to transmit the PUSCH or the format 1/1a/1b/3 of the PUCCH of the UE.

6. The method according to claim 1, wherein the UE determining the PUCCH, the PUSCH, or the PUCCH and the PUSCH to be transmitted on the current subframe according to availability of the last symbol of the current subframe for transmitting the PUCCH, the PUSCH, or the PUCCH and the PUSCH comprises:
when the last symbol of the current subframe is unable to transmit the PUSCH, the UE setting $N_{SRS}$ to be 1 when determining the number of time domain symbols occupied by transmitting the PUSCH; otherwise, the UE setting the $N_{SRS}$ to be 0, wherein the $N_{SRS}$ is a variable representing whether the current subframe needs to transmit the SRS; and
when the last symbol of the current subframe is unable to transmit the PUCCH format 1/1a/1b/3, the UE transmitting the PUCCH on the current subframe with a shortened format, otherwise, transmitting the PUCCH with a normal format.

7. The method according to claim 6, wherein the UE determining the number of the time domain symbols occupied by transmitting the PUSCH by a formula as follows to calculate:
$N_{symb}^{PUSCH-initial}=(2\cdot(N_{symb}^{UL}-1)-N_{SRS})$, where $N_{symb}^{PUSCH-initial}$ is the number of the time domain symbols occupied by transmitting the PUSCH, and $N_{symb}^{UL}$ is the number of symbols capable of being transmitted in one time slot.

8. The method according to claim 1, further comprising:
the UE transmitting the SRS with a high priority on the last symbol of the current subframe according to a preset priority rule when the UE simultaneously transmits SRSs on a plurality of uplink component carriers on the current subframe, and no the PUSCH, the PUCCH, or the PUSCH and the PUCCH of the UE is transmitted on the last symbol of the current subframe.

9. The method according to claim 1, further comprising:
the UE transmitting one SRS with a highest priority on the last symbol of the current subframe according to a preset priority rule when the UE simultaneously transmits SRSs on a plurality of uplink component carriers on the current subframe, and no the PUSCH, the PUCCH, or the PUSCH and the PUCCH of the UE is transmitted on the last symbol of the current subframe in a Long Term Evolution Advanced (LTE-A) system.

10. The method according to claim 1, further comprising:
when the UE simultaneously transmits SRSs on a plurality of uplink and downlink component carriers on the current subframe, and no the PUSCH, the PUCCH or the PUSCH and the PUCCH of the UE is transmitted on the last symbol of the current subframe, the UE transmitting one SRS with a highest priority on the last symbol of the current subframe according to a preset priority rule;
when the UE is configured by a higher-layer signaling to allow simultaneously transmitting n SRSs on the last symbol of the subframe, the UE transmitting the n SRSs with a high priority on the last symbol of the current subframe according to a preset priority rule, wherein n is an integer greater than 1; and alternatively,
when the UE is configured by the higher-layer signaling to not allow simultaneously transmitting the n SRSs on the last symbol of the subframe, the UE transmitting one SRS with a highest priority on the last symbol of the current subframe according to a preset priority rule.

11. The method according to claim 10, wherein the UE is configured by the higher-layer signaling to allow simultaneously transmitting the n SRSs on the last symbol of the subframe comprises one of the following:
the higher-layer signaling being a higher-layer signaling newly added to a Long Term Evolution Advanced (LTE-A) system, or the higher-layer signaling being a higher-layer signaling that has been defined by the LTE-A system and is configured to instruct to allow simultaneously transmitting a PUSCH and a PUCCH;
instructing to allow the UE to simultaneously transmit n SRSs by setting a higher-layer signaling, which is configured to instruct to allow simultaneously transmitting the PUSCH and the PUCCH, to be TRUE or ON; and
instructing that the UE can only transmit one SRS by setting a higher-layer signaling, which is configured to instruct to allow simultaneously transmitting the PUSCH and the PUCCH, to be FALSE or OFF.

12. The method according to claim 8, wherein the preset priority rule comprises: setting a priority of an uplink component carrier to be a priority of transmitting an SRS on a corresponding component carrier.

13. The method according to claim 8, wherein the preset priority rule comprises at least one of the following:
setting a priority of an aperiodic SRS to be higher than a priority of a periodic SRS;
setting a priority of an SRS on a primary uplink component carrier to be higher than a priority of other component carriers on the primary uplink component;
setting a priority of an SRS on a component carrier, on which a PUSCH with UCI is simultaneously transmitted, to be higher than a priority of an SRS on a component carrier on which a PUSCH without UCI is simultaneously transmitted; and setting a priority of an SRS on a component carrier, on which a PUSCH is simultaneously transmitted, to be higher than a priority of an SRS on a component carrier on which no PUSCH is simultaneously transmitted;

if priorities of SRSs on a plurality of component carriers are still the same after the above priority rules are applied, priorities of the uplink component carriers are set to be priorities of SRSs on a plurality of corresponding component carriers.

14. The method according to claim 1, wherein said preset rule further comprises:

the UE determining to transmit the PUCCH and not to transmit an aperiodic SRS on the current subframe when the UE simultaneously transmits PUCCH format 2/2a/2b and the periodic SRS on the current subframe.

15. The method according to claim 1, the preset rule further comprising:

when the UE simultaneously transmits the PUCCH, the PUSCH and the SRS on the current subframe and the higher-layer signaling that is configured to instruct to allow simultaneously transmitting the PUSCH and the PUCCH is FALSE or OFF, the UE firstly transmitting UCI information carried by the PUCCH on the PUSCH; and the UE determining transmission of the PUSCH and the SRS in accordance with a processing method of transmitting the PUSCH and the SRS on the same subframe.

16. The method according to claim 15, wherein the UE determining transmission of the PUSCH and the SRS in accordance with the processing method of transmitting the PUSCH and the SRS on the same subframe comprises:

the UE determining to transmit the PUSCH on the current subframe and not to transmit the SRS on the last symbol of the current subframe, when the UE simultaneously transmits the PUSCH and the SRS on the current subframe and when the last symbol of the current subframe is configured to transmit the PUSCH of the UE; and the UE determining to transmit the PUSCH on a symbol other than the last symbol of the current subframe and to transmit the SRS on the last symbol of the current subframe, when the UE simultaneously transmits the PUSCH and the SRS on the current subframe and when the last symbol of the current subframe is not configured to transmit the PUSCH of the UE.

17. The method according to claim 1, wherein said preset rule further comprises:

the UE determining to transmit the PUSCH or the PUCCH on the current subframe and not to transmit the SRS on the last symbol of the current subframe when the UE simultaneously transmits PUSCH or PUCCH format 1/1a/1b/3 and the SRS on the current subframe and the last symbol of the current subframe is configured to transmit the PUSCH or the PUCCH format 1/1a/1b/3 of the UE.

18. The method according to claim 1, wherein said preset rule further comprises:

when the UE simultaneously transmits a PUCCH, a PUSCH and the SRS on the current subframe, and a higher-layer signaling configured to instruct to allow simultaneously transmitting the PUSCH and the PUCCH is TRUE or ON, the UE firstly determining transmission of the PUCCH and the SRS in accordance with a processing method of transmitting the PUCCH and the SRS on the same subframe;

if the last symbol of the subframe still needs to transmit the SRS after the above processing, further determining transmission of the PUSCH and the SRS in accordance with a processing method of transmitting the PUSCH and the SRS on the same subframe.

19. The method according to claim 18, wherein the UE determining transmission of the PUSCH and the SRS in accordance with the processing method of transmitting the PUSCH and the SRS on the same subframe comprises:

the UE determining to transmit the PUSCH on the current subframe and not to transmit the SRS on the last symbol of the current subframe, when the UE simultaneously transmits the PUSCH and the SRS on the current subframe and when the last symbol of the current subframe is configured to transmit the PUSCH of the UE; and the UE determining to transmit the PUSCH on a symbol other than the last symbol of the current subframe and to transmit the SRS on the last symbol of the current subframe, when the UE simultaneously transmits the PUSCH and the SRS on the current subframe and when the last symbol of the current subframe is not configured to transmit the PUSCH of the UE.

20. The method according to claim 18, wherein determining transmission of the PUSCH and the SRS in accordance with the processing method of transmitting the PUSCH and the SRS on the same subframe comprises:

the UE determining to transmit the PUCCH and not to transmit a periodic SRS on the current subframe when the UE simultaneously transmits PUCCH format 2/2a/2b and the periodic SRS on the current subframe;

the UE determining to transmit the PUCCH and not to transmit an aperiodic SRS on the current subframe when the UE simultaneously transmits the PUCCH format 2/2a/2b multiplexed with ACK/NACK and the aperiodic SRS on the current subframe;

the UE determining not to transmit the PUCCH, and to transmit the aperiodic SRS on the current subframe when the UE simultaneously transmits a PUCCH format 2 without ACK/NACK and the aperiodic SRS on the current subframe;

the UE determining to transmit the PUCCH on the current subframe, and not to transmit the SRS on the last symbol of the current subframe when the UE simultaneously transmits the PUCCH format 1/1a/1b/3 and the SRS on the current subframe and the last symbol of the current subframe is configured to transmit PUCCH format 1/1a/1b/3 of the UE; and the UE determining to transmit the PUCCH on a symbol other than the last symbol of the current subframe, and to transmit the SRS on the last symbol of the current subframe when the UE simultaneously transmits the PUCCH format 1/1a/1b/3 and the SRS on the current subframe and the last symbol of the current subframe is not configured to transmit the PUCCH format 1/1a/1b/3 of the UE.

21. The method according to claim 9, wherein the preset priority rule comprises: setting a priority of an uplink component carrier to be a priority of transmitting an SRS on a corresponding component carrier.

22. The method according to claim 9, wherein the preset priority rule comprises at least one of the following:

setting a priority of an aperiodic SRS to be higher than a priority of a periodic SRS;

setting a priority of an SRS on a primary uplink component carrier to be higher than a priority of other component carriers on the primary uplink component;

setting a priority of an SRS on a component carrier, on which a PUSCH with UCI is simultaneously transmitted, to be higher than a priority of an SRS on a component carrier on which a PUSCH without UCI is simultaneously transmitted; and setting a priority of an SRS on a component carrier, on which a PUSCH is simultaneously transmitted, to be higher than a priority of an SRS on a component carrier on which no PUSCH is simultaneously transmitted;

if priorities of SRSs on a plurality of component carriers are still the same after the above priority rules are applied, priorities of the uplink component carriers are set to be priorities of SRSs on a plurality of corresponding component carriers.

23. The method according to claim 10, wherein the preset priority rule comprises: setting a priority of an uplink component carrier to be a priority of transmitting an SRS on a corresponding component carrier.

24. The method according to claim 11, wherein the preset priority rule comprises: setting a priority of an uplink component carrier to be a priority of transmitting an SRS on a corresponding component carrier.

25. The method according to claim 10, wherein the preset priority rule comprises at least one of the following:

setting a priority of an aperiodic SRS to be higher than a priority of a periodic SRS;

setting a priority of an SRS on a primary uplink component carrier to be higher than a priority of other component carriers on the primary uplink component;

setting a priority of an SRS on a component carrier, on which a PUSCH with UCI is simultaneously transmitted, to be higher than a priority of an SRS on a component carrier on which a PUSCH without UCI is simultaneously transmitted; and setting a priority of an SRS on a component carrier, on which a PUSCH is simultaneously transmitted, to be higher than a priority of an SRS on a component carrier on which no PUSCH is simultaneously transmitted;

if priorities of SRSs on a plurality of component carriers are still the same after the above priority rules are applied, priorities of the uplink component carriers are set to be priorities of SRSs on a plurality of corresponding component carriers.

26. The method according to claim 11, wherein the preset priority rule comprises at least one of the following:

setting a priority of an aperiodic SRS to be higher than a priority of a periodic SRS;

setting a priority of an SRS on a primary uplink component carrier to be higher than a priority of other component carriers on the primary uplink component;

setting a priority of an SRS on a component carrier, on which a PUSCH with UCI is simultaneously transmitted, to be higher than a priority of an SRS on a component carrier on which a PUSCH without UCI is simultaneously transmitted; and setting a priority of an SRS on a component carrier, on which a PUSCH is simultaneously transmitted, to be higher than a priority of an SRS on a component carrier on which no PUSCH is simultaneously transmitted;

if priorities of SRSs on a plurality of component carriers are still the same after the above priority rules are applied, priorities of the uplink component carriers are set to be priorities of SRSs on a plurality of corresponding component carriers.

27. A device for transmitting data, comprising a first determining module, configured to determine, according to a preset rule, whether or not to transmit physical uplink control channel (PUCCH), physical uplink shared channel (PUSCH), the PUCCH and the PUSCH, or a sounding reference signal (SRS) on a last symbol of a current subframe;

a second determining module, configured to determine the PUCCH, the PUSCH, or the PUCCH and the PUSCH to be transmitted on the current subframe according to availability of the last symbol of the current subframe for transmitting the PUCCH, the PUSCH, or the PUCCH and the PUSCH; and a transmitting module, configured to transmit the PUCCH, the PUSCH or the PUCCH and the PUSCH on the current subframe, or the SRS on the last symbol of the current subframe, or the PUCCH, the PUSCH, or the PUCCH and the PUSCH on the current subframe and the SRS on the last symbol of the current subframe;

wherein said preset rule comprises: when the PUCCH format is format 1/1a/1b/3, the UE determining not to transmit the PUCCH on the last symbol of the current subframe when the higher-layer configured parameter for simultaneous transmission of ACK/NACK and SRS is TRUE for the UE and when the current subframe is higher-layer configured as a cell-specific SRS subframe for the primary component carrier.

28. A method for transmitting data, comprising:

a user equipment (UE) determining, according to a preset rule, whether or not to transmit physical uplink control channel (PUCCH), physical uplink shared channel (PUSCH), the PUCCH and the PUSCH, or a sounding reference signal (SRS) not on a last symbol of a current subframe;

the UE determining the PUCCH, the PUSCH, or the PUCCH and the PUSCH to be transmitted on the current subframe according to availability of the last symbol of the current subframe for transmitting the PUCCH, the PUSCH, or the PUCCH and the PUSCH; and the UE transmitting:

(a) the PUCCH, the PUSCH, or the PUCCH and the PUSCH on the current subframe, (b) the SRS on the last symbol of the current subframe, or (c) the PUCCH, the PUSCH, or the PUCCH and the PUSCH on the current subframe, and the SRS on the last symbol of the current subframe;

wherein said preset rule comprises: (i) the UE determining to transmit the PUCCH and not to transmit an aperiodic SRS on the current subframe when the UE simultaneously transmits PUCCH format 2/2a/2b multiplexed with an ACK/NACK and the aperiodic SRS on the current subframe, and (ii) the UE determining not to transmit the PUCCH and to transmit an aperiodic SRS on the current subframe when the UE simultaneously transmits a PUCCH format 2 without ACK/NACK and the aperiodic SRS on the current subframe.

* * * * *